United States Patent
Tatunashvili et al.

(10) Patent No.: US 12,282,976 B2
(45) Date of Patent: Apr. 22, 2025

(54) AUTOMATICALLY ENHANCING CONTENT ITEMS THROUGH IDENTIFYING RELATIONSHIPS

(71) Applicant: International Business Machines Corporation, Armonk, NY (US)

(72) Inventors: Anna Tatunashvili, Bratislava (SK); George Thayyil Jacob Sushil, Bangalore (IN); Rupam Bhattacharjee, Karimganj (IN); Siba Prasad Satapathy, Horamavu (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 239 days.

(21) Appl. No.: 17/545,858

(22) Filed: Dec. 8, 2021

(65) Prior Publication Data
US 2023/0177631 A1 Jun. 8, 2023

(51) Int. Cl.
*G06Q 50/20* (2012.01)
*G06F 9/445* (2018.01)

(52) U.S. Cl.
CPC ....... *G06Q 50/205* (2013.01); *G06F 9/44505* (2013.01)

(58) Field of Classification Search
CPC .. G06Q 50/205; G06F 9/44505; G06N 20/00; G06N 3/084
See application file for complete search history.

(56) References Cited

U.S. PATENT DOCUMENTS 6,884,074 B2 4/2005 Theilmann
8,874,023 B2 10/2014 Elzinga et al.
(Continued)

FOREIGN PATENT DOCUMENTS

IN 1315DEL2008 A 8/2016
WO 2021091526 A1 5/2021

OTHER PUBLICATIONS

Hanjalic, A., "Content-Based Analysis of Digital Video", © 2004 Kluwer Academic Publishers, Boston, Chapter 1—Introduction, 27 pp. (Available at: https://books.google.sk/books?id=qA4GCAAAQBAJ&pg=PA135&lpg=PA135&dq=video+content+context+indexing&source=bl&ots=YuTMz-6fec&sig=ACfU3U0HtUggTqrlfhN9IMa94Btaf5Gz9g&hl=en&sa=X&ved=2ahUKEwi-gL35rZ_qAhWillsKHdzpAnwQ6AEwAnoECAYQAQ#v=onepage&q=video%20content%20context%.
(Continued)

*Primary Examiner* — Dennis W Ruhl
(74) *Attorney, Agent, or Firm* — KONRAD, RAYNES, DADVA & VICTOR LLP; Janaki K . Davda

(57) ABSTRACT

Provided are techniques for automatically enhancing content items through identifying relationships. One or more content items and an associated transcript for each of the one or more content items are received. One or more terms are identified in the one or more content items. A content tree is built for each of the one or more content items using the one or more terms and corresponding contexts. A content graph is built using each content tree. One or more subgraphs of the content graph are identified. One or more paths through each of the one or more subgraphs are identified and one or more content expansion recommendations are provided. In response to selection of a content item, the one or more paths are used to provide an enhanced content item with one or more prerequisite content items and one or more subsequent content items.

20 Claims, 19 Drawing Sheets

(56) References Cited

U.S. PATENT DOCUMENTS

| | | | |
|---|---|---|---|
| 2005/0071755 A1* | 3/2005 | Harrington | G06F 40/197 |
| | | | 715/205 |
| 2017/0032324 A1* | 2/2017 | Grover | G06Q 10/1053 |
| 2019/0340945 A1* | 11/2019 | Malhotra | G09B 5/12 |
| 2020/0302296 A1* | 9/2020 | Miller | G06N 20/20 |
| 2021/0014575 A1 | 1/2021 | Selfors | |
| 2021/0065325 A1* | 3/2021 | Alkan | G06F 16/9535 |
| 2021/0174164 A1* | 6/2021 | Hsieh | G06Q 30/0282 |
| 2022/0415199 A1* | 12/2022 | Venkatasubramanyam | |
| | | | G06F 16/9535 |
| 2023/0080407 A1* | 3/2023 | Kumar | G06F 40/166 |
| | | | 715/717 |

OTHER PUBLICATIONS

Mell et al., "Effectively and Securely Using the Cloud Computing Paradigm" dated Oct. 7, 2009, NIST, Information Technology Laboratory, 80 pp.

Mell et al., "The NIST Definition of Cloud Computing" dated Sep. 2011, Recommendations of the National Institute of Standards and Technology, 7 pp.

Resource Learning Design, "Why is Online Learning Better and More Effective Than Classroom Learning?", [online], Aug. 12, 2020, [Retrieved on Nov. 16, 2021], Retrieved from the Internet at <URL: https://resourcelearning.co.uk/why-is-online-learning-better-and-more-effective-than-classroom-learning/>, 3 pp.

* cited by examiner

AUTOMATICALLY ENHANCING CONTENT ITEMS THROUGH IDENTIFYING RELATIONSHIPS

BACKGROUND

Embodiments of the invention relate to automatically enhancing content items through identifying relationships.

Digital learning is gaining increased popularity each year. More digital materials are being uploaded to the World Wide Web (WWW) in form of books, articles, and videos every day.

Also, recently, there has been an increase in online learning across many industries (e.g., schools, universities, organizational learning industries, providers of online content resources, digital event organizers, etc.). Due to recent limitations of in-person interactions, there has been an increased desire for online learning.

Previously, many schools and universities did not provide an online education. In cases in which online learning programs and software were available, often, traditional in-person learning was the preferred, primary form of learning.

Some research shows that on average, students retain more material when learning online as compared to an in-person classroom setting. This may be due to the students being able to learn at their own pace (e.g., students are able to re-read, skip, or accelerate through concepts).

Schools, universities, organizations and other learning institutes are investing time and money to ensure a streamlined, consistent and innovative way to convey ideas, concepts, and subjects. Educational and informational content is being available to many people, providing a more flexible way of learning for anyone who wishes to grow their knowledge and skill set.

For example, professionals are expected to increase their time spent on online learning. Also, educational tech firms are available to assist with online learning as more schools, universities, organizations, and other learning institutes move to online learning.

SUMMARY

In accordance with certain embodiments, a computer-implemented method is provided for automatically enhancing content items through identifying relationships. The computer-implemented method comprises operations. One or more content items and an associated transcript for each of the one or more content items are received. One or more terms are identified in the one or more content items. A content tree is built for each of the one or more content items using the one or more terms and corresponding contexts of the one or more terms from each associated transcript. A content graph is built using each content tree. One or more subgraphs of the content graph are identified. One or more paths through each of the one or more subgraphs are identified, where the one or more paths in a subgraph intersect at an intersection content item in the subgraph and identify one or more prerequisite content items for the intersection content item, one or more subsequent content items for the intersection content item, and one or more content expansion recommendations. In response to selection of a content item of the one or more content items, the one or more paths are used to provide an enhanced content item with the one or more prerequisite content items and the one or more subsequent content items.

In accordance with other embodiments, a computer program product is provided for automatically enhancing content items through identifying relationships. The computer program product comprises a computer readable storage medium having program code embodied therewith, the program code executable by at least one processor to perform operations. One or more content items and an associated transcript for each of the one or more content items are received. One or more terms are identified in the one or more content items. A content tree is built for each of the one or more content items using the one or more terms and corresponding contexts of the one or more terms from each associated transcript. A content graph is built using each content tree. One or more subgraphs of the content graph are identified. One or more paths through each of the one or more subgraphs are identified, where the one or more paths in a subgraph intersect at an intersection content item in the subgraph and identify one or more prerequisite content items for the intersection content item, one or more subsequent content items for the intersection content item, and one or more content expansion recommendations. In response to selection of a content item of the one or more content items, the one or more paths are used to provide an enhanced content item with the one or more prerequisite content items and the one or more subsequent content items.

In accordance with yet other embodiments, a computer system is provided for automatically enhancing content items through identifying relationships. The computer system comprises one or more processors, one or more computer-readable memories and one or more computer-readable, tangible storage devices; and program instructions, stored on at least one of the one or more computer-readable, tangible storage devices for execution by at least one of the one or more processors via at least one of the one or more memories, to perform operations. One or more content items and an associated transcript for each of the one or more content items are received. One or more terms are identified in the one or more content items. A content tree is built for each of the one or more content items using the one or more terms and corresponding contexts of the one or more terms from each associated transcript. A content graph is built using each content tree. One or more subgraphs of the content graph are identified. One or more paths through each of the one or more subgraphs are identified, where the one or more paths in a subgraph intersect at an intersection content item in the subgraph and identify one or more prerequisite content items for the intersection content item, one or more subsequent content items for the intersection content item, and one or more content expansion recommendations. In response to selection of a content item of the one or more content items, the one or more paths are used to provide an enhanced content with the one or more prerequisite content items and the one or more subsequent content items.

BRIEF DESCRIPTION OF THE SEVERAL VIEWS OF THE DRAWINGS

Referring now to the drawings in which like reference numbers represent corresponding parts throughout.

DETAILED DESCRIPTION

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

An online course may depend on content items (e.g., learning materials), such as video recordings ("videos"), audio recordings, and/or written materials (e.g., text documents, such as articles) stored in a knowledge base. For example, while a speaker (e.g., a teacher or a professor) is lecturing about a particular subject in a video, the speaker may use a term or concept without explaining what that term or a concept means. In this example, a student is attending a Data Science introductory course that mentions linear algebra, and the student wants to understand linear algebra before continuing with the online course. Although the original video did not cover linear algebra, embodiments enhance the original video to enable the student to select an option to learn about linear algebra. This avoids the student continuing with the video and later looking up linear algebra.

Embodiments automatically enhance content items through identifying relationships. In certain embodiments, the relationships include relationships between a content item and users' behavior (such as user feedback on the content item and users viewing the content item) and relationships between content items.

Embodiments enhance the content items to provide context-based lookup (e.g., web content having a dictionary lookup). Embodiments enhance the content items to provide context-based linkage that is inserted at a particular time of the content items (e.g., a first video) to other content items (e.g., a second video) at another particular time.

Embodiments enhance the content items to provide personalized learning. For example, not every student learns the same way or at the same pace. Although current online learning courses may assume the same learning level for different students and do not curate content, embodiments adjust existing courses and generalized content based on the student's experience level, rather than just mentioning prerequisites for the online learning course.

Moreover, embodiments may provide users with a digital handbook, with the summary of the content items (e.g., learning/informational material/content) and additional information for reference.

Figure 1:
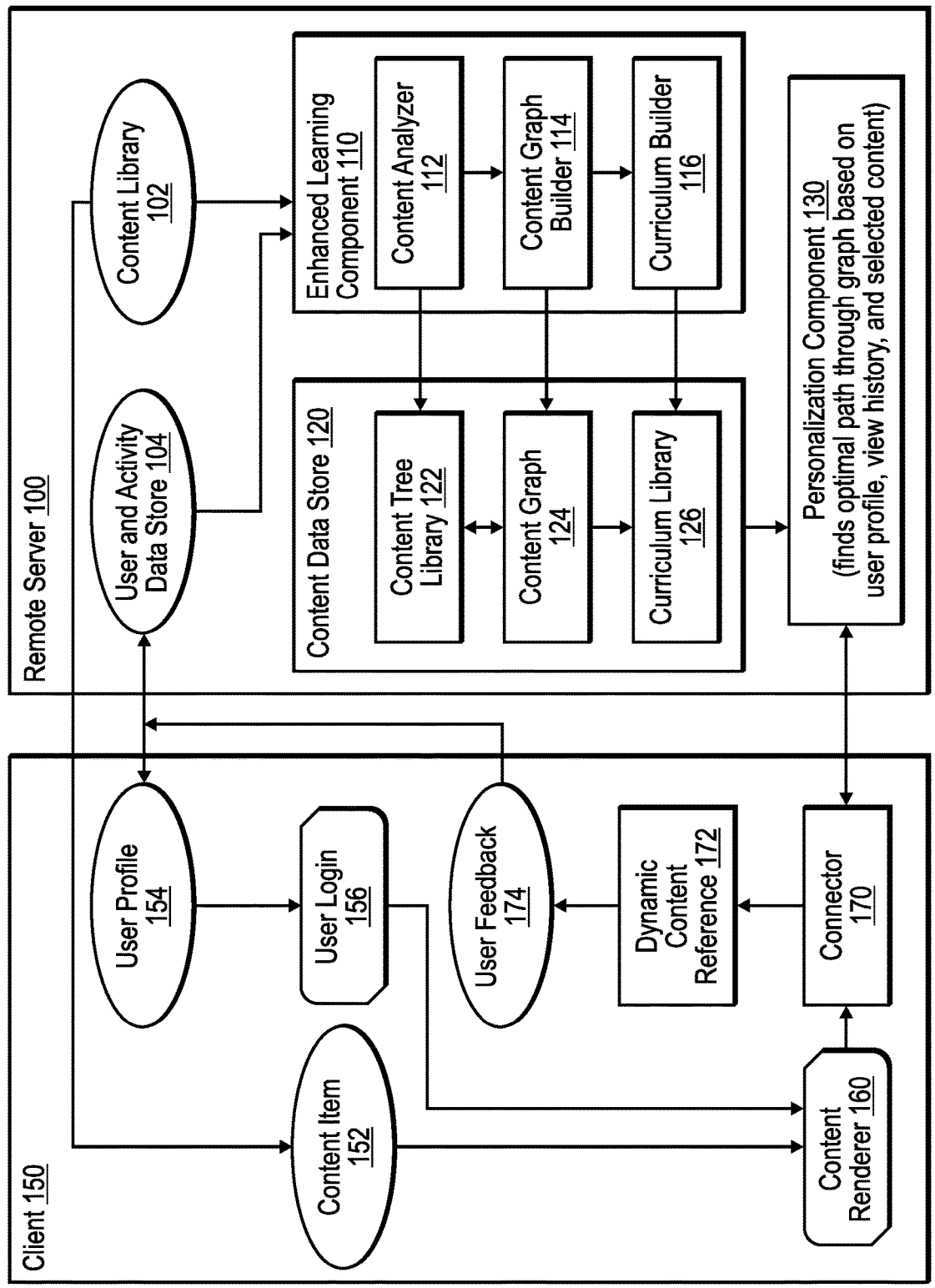
FIG. 1 illustrates, in a block diagram, a computing environment in accordance with certain embodiments.

FIG. 1 illustrates, in a block diagram, a computing environment in accordance with certain embodiments. A client 150 is connected to a remote server 100. The connection may be via a network, such as the internet, a local area network, etc.

Input data sources are shown in ellipticals for ease of identification in FIG. 1. On the remote server 100, the input source data includes a content library 102 and a user and activity data store 104. The content library 102 includes content items (e.g., learning materials), such as videos and transcripts of the videos, audio recordings and transcripts of the audio recordings, text documents, etc. Each of the content items (e.g., each video, each audio recording, each text document, etc.) has a unique identifier (ID). The user and activity data store 140 includes user profiles (which may include answers to user questionnaires on expertise and interests), user feedback (which may include content ratings and recommendation ratings), user activities (e.g., view histories, content items viewed, curriculums passed, suggested terms, etc.). In certain embodiments, personal information may be stored separately, in a secured data store and masked in the user and activity data store 104. If a user requests removal of the personal data, the secure data store is adjusted, while user behavior/preferences may remain in the user and activity data store 104.

On the client 150, the input data sources include a content item 152 (e.g., a video selected from the content library 102) and a user profile 154 (which may be selected from the user profiles stored in the user and activity data store 104 based on various factors, such as the topic of the content item).

The remote server 100 includes an enhanced learning component 110, a content data store 120, and a personalization component 130. The enhanced learning component 110 includes a content analyzer, a content graph builder 114, and a curriculum builder 116. The enhanced learning component 110 may be described as a learning model that continuously analyzes data, enhancing content items and learning paths. Although there are many possible implementations of embodiments of the invention, in certain embodiments, the content analyzer 112, the content graph builder 114, the curriculum builder 116, and/or the personalization component 130 may each be implemented using machine learning models.

The content data store 120 stores a content tree library 122, the content graph 124, and a curriculum library 126. In certain embodiments, the enhanced learning component 110 is divided into three processes, and the results generated by these processes are stored in the content data store 120. The content analyzer 112 generates content trees based on dissection of the content items into terms and context analysis, and the content trees are stored in the content tree library 122. The content graph builder 114 builds the content graph 124 to reflect relationships between the content items. The content graph 124 has vertices (i.e., nodes) and edges connecting the vertices. In certain embodiments, the content graph is a directed multigraph. The curriculum builder 116 generates the curriculum library 126 based on analysis of the content graph 124 for identification of possible learning paths and curriculums. A learning path may be described as a set of content items on a subject that include prerequisite content items, an intersection content item, and subsequent content items that is personalized for a user. A curriculum may be described as a pre-defined, organized set of content items on a subject. The learning paths may be stored in the curriculum library 126.

On the client 150, the actions taken include the user logging in (e.g., with a username and a password, with a fingerprint, with an eye scan, etc.) and initiating the content renderer 160.

Once the content item 152 and the user profile 154 are selected, and the user has logged in (block 156), a content renderer 160 sends the content item 152 and the user profile 154 to the connector 170, which sends an Application Programming Interface (API) call to the personalization component 130. In this manner, the client 150 interacts with the remote server 100 with the client 150 connecting to the remote server 100 and sending a request to the personalization component 130. The client 150 receives, at the connector 170, packets from the remote server 100 for the content item enhanced with dynamic content references.

Embodiments provide the enhanced learning component 110, the content data store 120, and the personalization component 130 to provide the enhancements to the content items, including the content tree library 122, the content graph 124, and the curriculum library 126.

In certain embodiments, the personalization component 130 receives generated data from the content data store 120 and selects an optimal learning path and content in that learning path based on the content item 152 selected, the user profile 154, and the view history. To reduce the load on the client 150, the personalization component 130 performs processing on the remote server 100 and sends back a response to the client 150.

In certain embodiments, on the client 150, the user performs user login and initiates the content renderer, which recognizes the load of the content item and triggers the personalization component 130, which is initiated through the API call.

In certain embodiments, the personalization component 130 is invoked with an API call representing a request from the client 150 that includes an identifier of the user profile (or the use profile itself) and the identifier of the content item (or the content item itself). The personalization component 130 then identifies the learning path and provides that to the client 150 by sending packets to the connector 170.

The personalization component 130 may also return the content items referenced by the learning path (or identifiers of the content items) with dynamic content references inserted into those content items (e.g., links in transcripts of videos).

Figure 2:
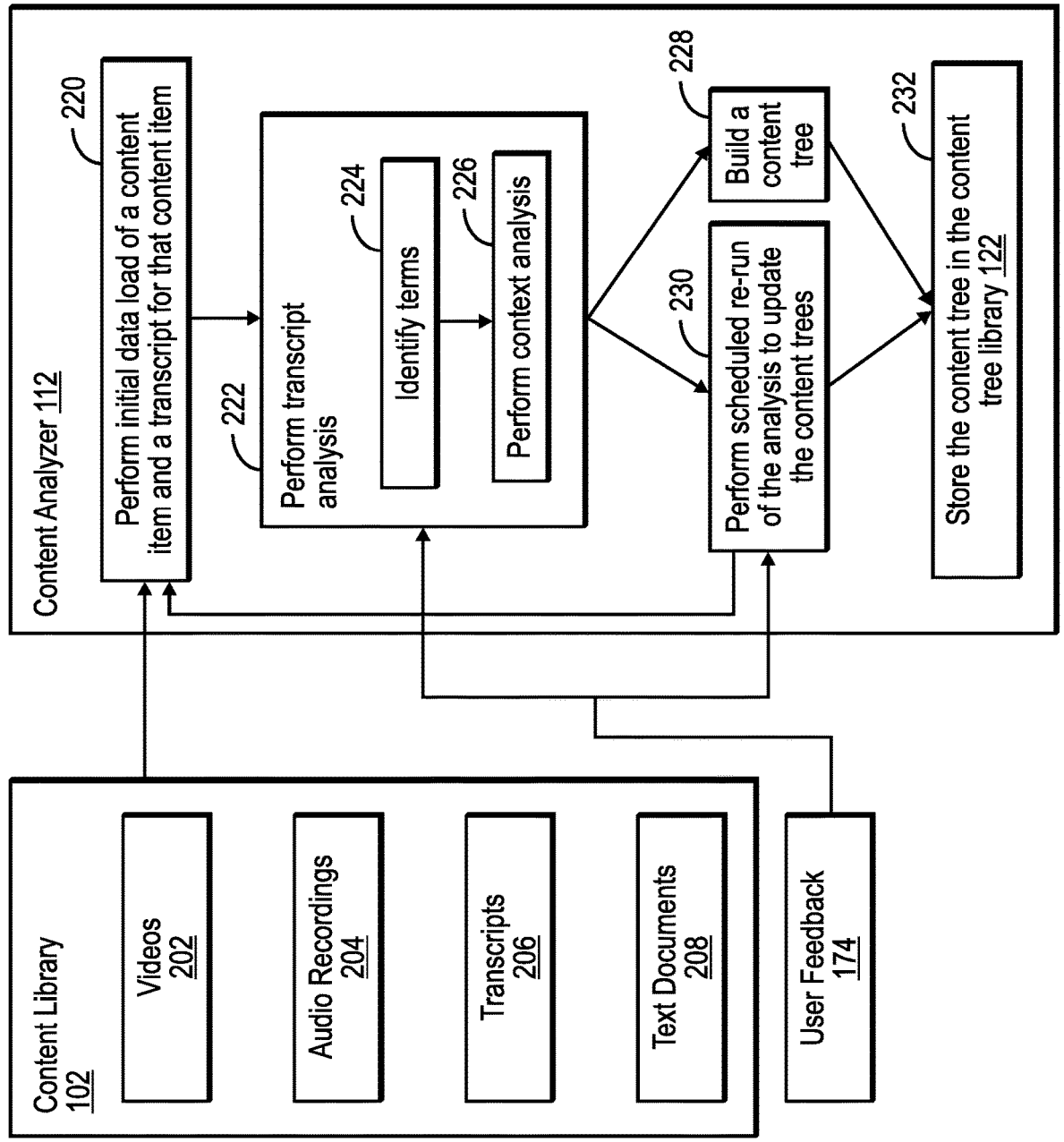
FIG. 2 illustrates, in a flowchart, operations performed by a content analyzer in accordance with certain embodiments.

FIG. 2 illustrates, in a flowchart, operations performed by the content analyzer 112 in accordance with certain embodiments. The content analyzer 112 performs deep analysis of the existing content in the content library 102. The content library 102 includes content items, such as videos 202, audio recordings 204, transcripts 206, and text documents 208. In certain embodiments, there is a transcript 206 for each video 200 and each audio recording 204.

Control begins with the content analyzer 112 performing initial data load of a content item (e.g., video or audio recording) and a transcript of that content item (block 220). The content analyzer 112 performs transcript analysis (block 222). The transcript analysis includes identifying terms (block 224) and performing context analysis (block 226).

In certain embodiments, the content analyzer 112 identifies terms (e.g., technical terms) used in the content item using a keyword extraction process. For each identified term, the content analyzer 112 saves an occurrence timestamp (which indicates a time at which that term was used in the video or audio recording) and increments a count of occurrences (which indicates an amount of mentions of that term and may be referred to as a total term count). In certain embodiments, to improve the set of identified terms, the content analyzer 112 provides additional functionality to the user interface to allow users to mark terms that they are interested in directly in the transcript. In this case, the content analyzer 112 adds the marked terms to a content glossary using the user feedback 174.

In certain embodiments, the content analyzer 112 analyzes the context in which each of the terms is mentioned using a natural language processor to identify the context (e.g., selecting keywords and identifying terms) and to identify an experience level (or complexity of the term). In certain embodiments, the natural language processor may also be used to determine whether the term was mentioned or defined. In addition, the content analyzer 112 may use image processing to enrich the analysis of the context (e.g., to identify that any examples are shared or using certain technology or tools).

In response to completing the transcript analysis, the content analyzer 112 builds a content tree (block 228). The content tree building process is initiated to organize the gathered data in the content tree data structure. In certain embodiments, the content analyzer 112 consolidates terms by context and builds the content tree. The content analyzer 112 stores the content tree in the content tree library 122 (block 232). The content analyzer 112 also assigns a content identifier (content ID) to each content tree. In certain embodiments, the content analyzer 112 creates a content tree for each content item.

The content analyzer 112 also performs scheduled re-runs of the analysis to update the content trees (block 230). Initially, the content analyzer 112 performs content analysis on the existing content in the content library 102. Going forward, for the scheduled re-runs, the content analyzer 112 performs content analysis on a regular basis (e.g., based on a schedule or triggered by updates in the content library 102 or the user feedback 174) for newly added content items and/or updated content items and for user feedback to revalidate relationships between content items. The content analyzer 112 stores the updated content trees in the content tree library 122 (block 232).

In certain embodiments, when building the content tree, the content analyzer 112 represents the content item as the root vertex of the content tree, with metadata stored as vertex parameters. In certain embodiments, the content item parameters for a content item include: content item identifier (ID), title, description, length, rank (users' feedback score), price, etc. The root vertex may also be referred to as the content item vertex.

In certain embodiments, the content analyzer 112 adds the terms identified in block 224 as child vertices (which may be referred to as "term" vertices), with metadata stored as vertex parameters. In certain embodiments, the term parameters for a term vertex include: term identifier (ID), term name, and count of occurrences. The term IDs are unified across the content trees, so that terms with the same name, identified in multiple content items, are assigned the same term ID.

In certain embodiments, the content analyzer 112 stores the specific mention of the term in the content item as edges (connections). In this case, the content item may have multiple edges (connections) to a single term, depending on the context. In certain embodiments, the edge parameters that are stored for the edges include: mention id, (unique in each content tree), context (e.g., a list of keywords and terms identified in block 226), timestamp of when the term was mentioned in the content (and there may be multiple timestamps if mentioned in the same context more than once), identified experience level, and type of occurrence (e.g., whether the term was mentioned or defined). The list of parameters may be increased to provide more granularity. For example, a type of definition may be added, such as: history, description, definition, example, etc.

Figure 3:
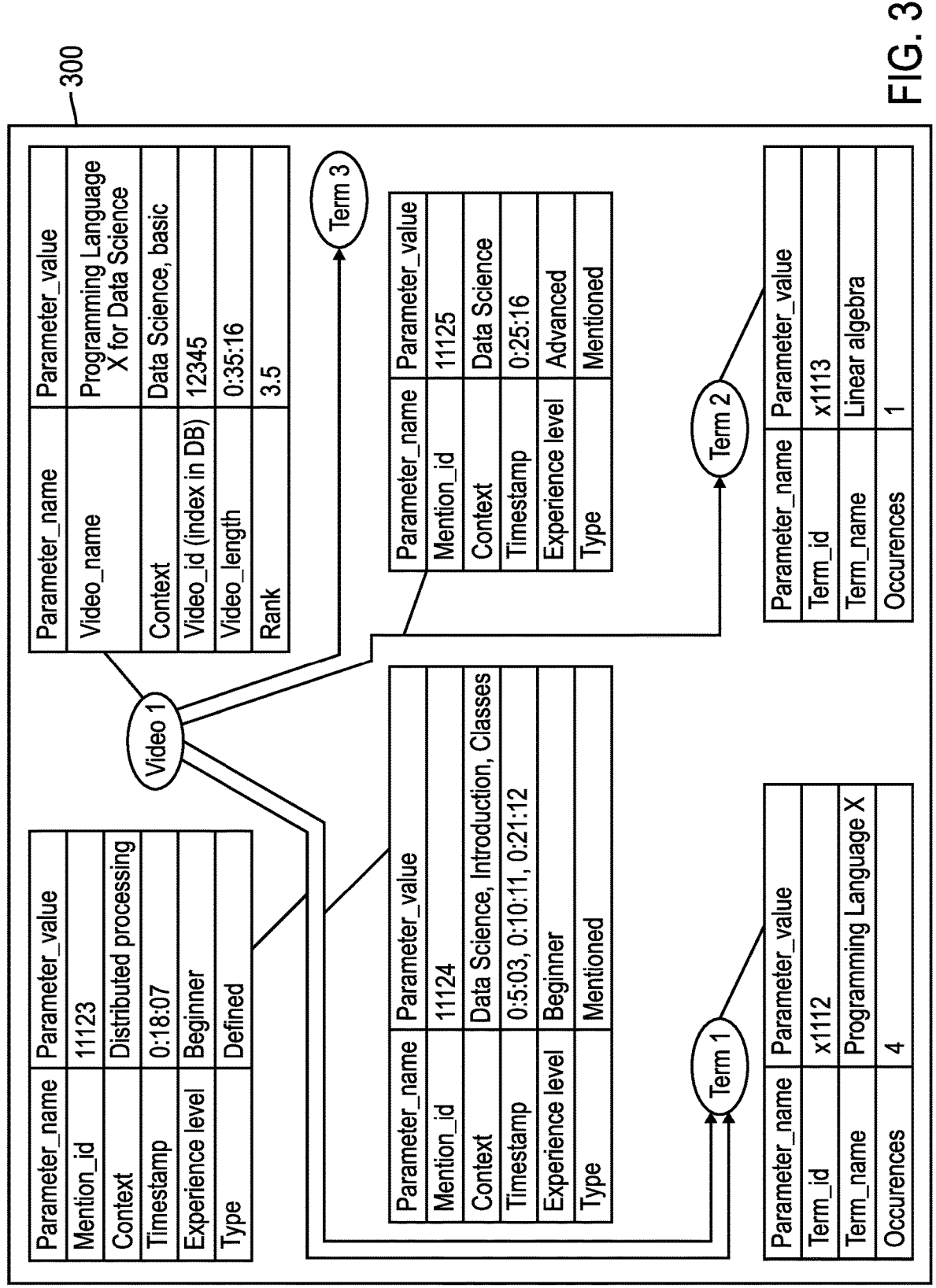
FIG. 3 illustrates an example content tree in accordance with certain embodiments.

FIG. 3 illustrates an example content tree 300 in accordance with certain embodiments. In the content tree 300, Video 1 is the root vertex, while Term 1, Term 2, and Term 3 are child vertices. Term 1 is mentioned twice in Video 1, so there are two edges connecting Video 1 and Term 1.

Figure 4:
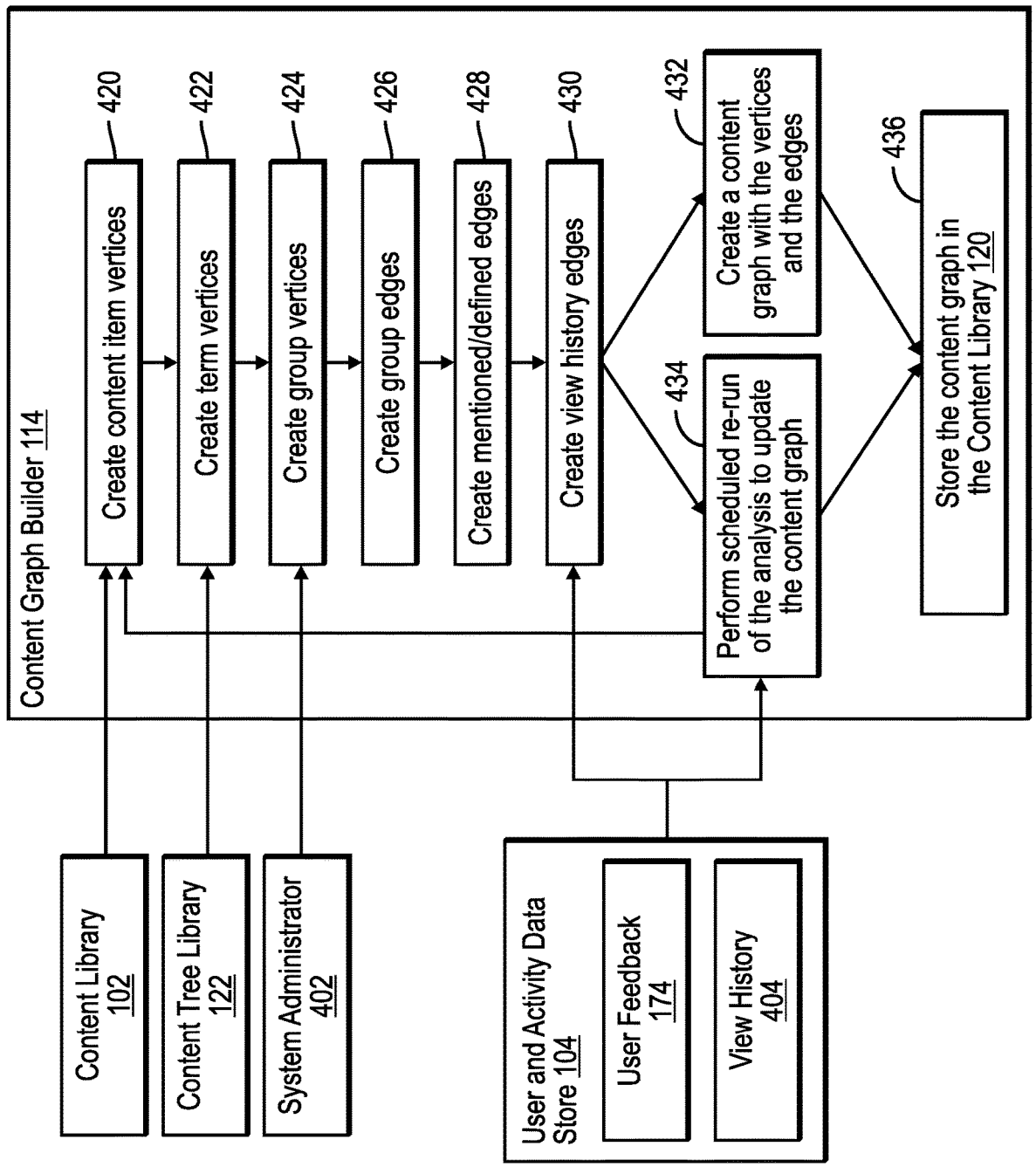
FIG. 4 illustrates, in a flowchart, operations performed by a content graph builder in accordance with certain embodiments.

FIG. 4 illustrates, in a flowchart, operations performed by the content graph builder 114 in accordance with certain embodiments. After initial analysis of the content items are complete, the content graph builder 114 is initiated (by the content analyzer 112) to structure the gathered data in graph format. Based on the multiple types of mentions and relationships between the content item, terms, and edges, the content graph builder 114 builds the content graph as a property type of graph (otherwise called a labeled and directed attributed multigraph). The content graph allows multiple connections between the vertices and allows passing different functions to the vertices using the attributes.

Control begins with the content graph builder 114 creating vertices (blocks 420, 422, 424). For each content item in the content library 102, the content graph builder 114 creates a vertex with type "Content Item" (or "Content") and defined properties: identifier, name (e.g., title of a video), duration, topics, description, rank (users' feedback score), link, etc. (block 420).

For each unique term identified in the content tree library 122, the content graph builder 114 creates a vertex with type "Term" and defined properties: identifier, type, name, experience level coverage (for each experience level defined, an indicator (marker) is set to identify whether that experience level has coverage or not) (block 422).

In certain embodiments, the content graph builder 114 identifies groups (i.e., groupings) for the existing content items for search and filter simplification. In certain embodiments, the list of groups may be set and modified by a system administrator 402 or other user. As an example, content may be grouped by length, language, format, and subject. For each group, the content graph builder 114 creates an additional vertex with type "Group" and defined properties: identifier, type, name, value, parameter, etc. (block 424). Each group vertex may connect to each content item vertex that is in that group.

Once the vertices are defined, the content graph builder 114 creates edges between the vertices (blocks 426, 428, 430). The content graph builder 114 builds group edges, which contain general information on which group the content item belongs to (block 426). The group edges have type "Grouped" and contain properties, such as: identifier and label. Each content item may be a member of one or more groups connected with edge from group vertex to content item vertex. The content graph builder 114 builds the group edges based on affiliation of the content items to groups.

The content graph builder 114 builds mention/defined edges (e.g., based on relationships identified in the content trees). The mention/defined edges contain general information on which "term" those content items are connected to. In accordance with content tree definitions, the connections may be of two types: "Mentioned" and "Defined". Edges from content item to term vertices may be both mentioned and defined types and contain basic properties, such as: id, type, context, timestamp and experience level (which may be blank if the experience level was not identified by the context). The edges connecting the term back to the content item vertices are built for defined types and contain detailed information on the relationship, such as: identifier, type, context, timestamp (which may be multiple values), duration, experience level, confidence level, and rank (users' feedback on the content item). Each content item vertex may have multiple edges to a single term, based on connection type, context, and experience level. The content graph builder 114 may use natural language processing and automated reasoning technologies to define and recalculate a confidence level for each of the edges based on properties, such as: reference rank, context match, content item rank, users' feedback, etc. In certain embodiments, the confidence level is a score that is assign to each of the content items to mark the accuracy of the recommendation. Revalidation of the confidence level score allows embodiments to improve recommendations of related content items over time based on, for example, users' feedback.

Based on the edges originating from the terms and their identified experience level, the experience level properties are filled in. The experience level property indicates whether there is a defined connection for a specific experience level. The following options may be selected: "covered" (when the edge exist), "not covered" (if no edge is present for specified experience level), and "to be improved" (if the existing edges for the specified experience level are connected to low ranked content).

The content graph builder 114 creates view history edges based on activity data store (block 430). The content graph builder 114 connects the content item vertices directly with the view history edges based on user manual learning paths. The view history edges may be used for improving the curriculum building process.

Once the vertices and edges have been created, the content graph builder 114 creates the content graph (block 432) and stores the content graph 124 in the content data store 120 (block 436). In certain embodiments, the content graph builder 114 builds one content graph for the content items in the content data store 120. The content graph builder 114 also performs scheduled re-runs of the analysis to update the content graph (block 434). Similar to the content tree building process, initially, the content graph builder 114 performs graph building on the existing content in the content library 102. Going forward, the content graph builder 114 updates the graph on a regular basis (e.g., based on a schedule or triggered by updates in the content library 102, the user feedback 174 or the view history 404) to apply changes to the content items, terms and groups (vertices), user feedback (ranks and confidence levels), and view history (edges). The content graph builder 114 stores the updated content graph 124 in the content data store 120 (block 436).

Additional properties may be added as key-value pairs to both vertices and edges to increase the granularity of identified relations.

Figure 5:
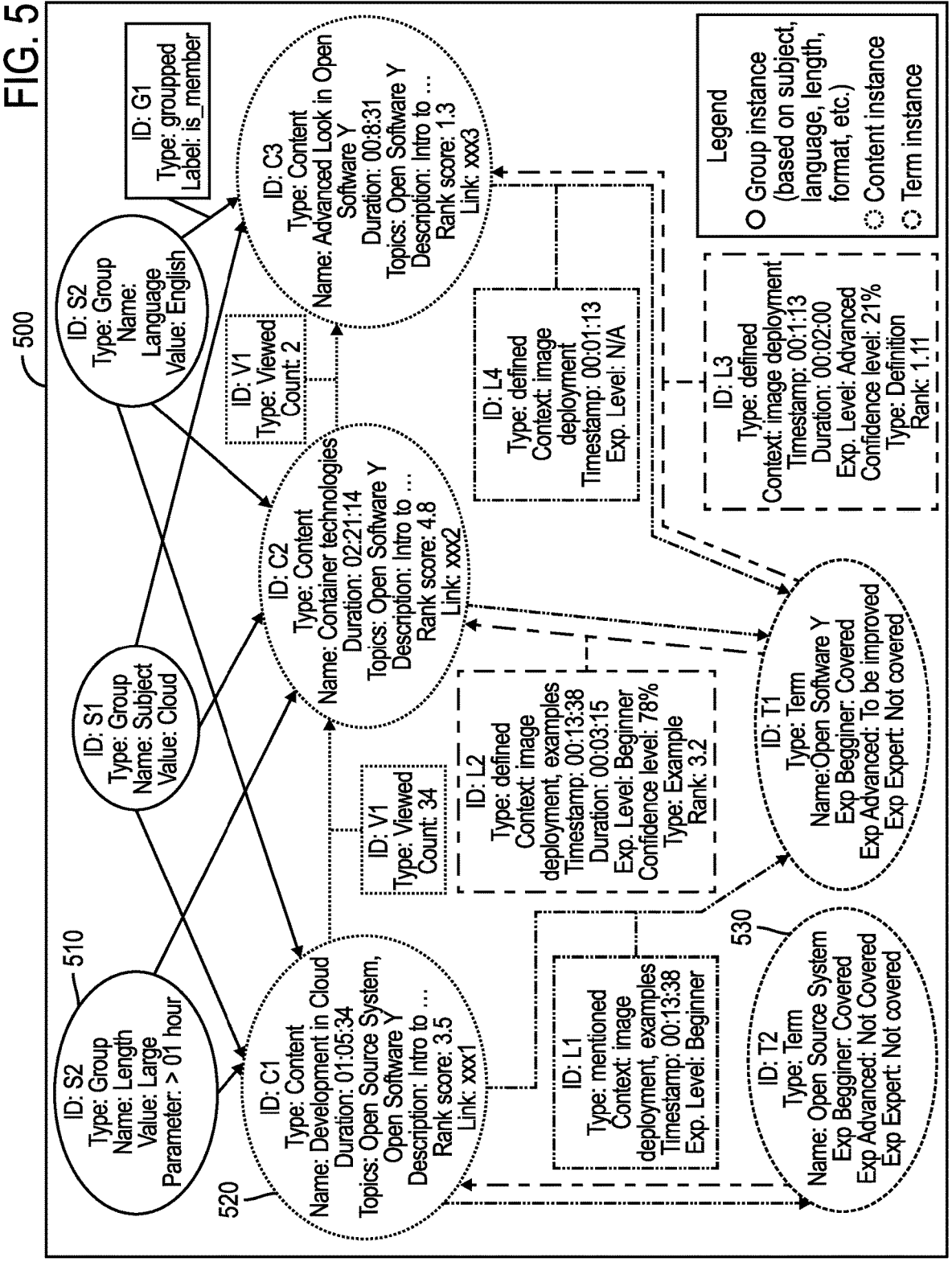
FIG. 5 illustrates an example content graph in accordance with certain embodiments.

FIG. 5 illustrates an example content graph 500 in accordance with certain embodiments. For example, the content graph 500 includes a group vertex 510, a content item instance 520, and a term instance 530.

Figure 6:
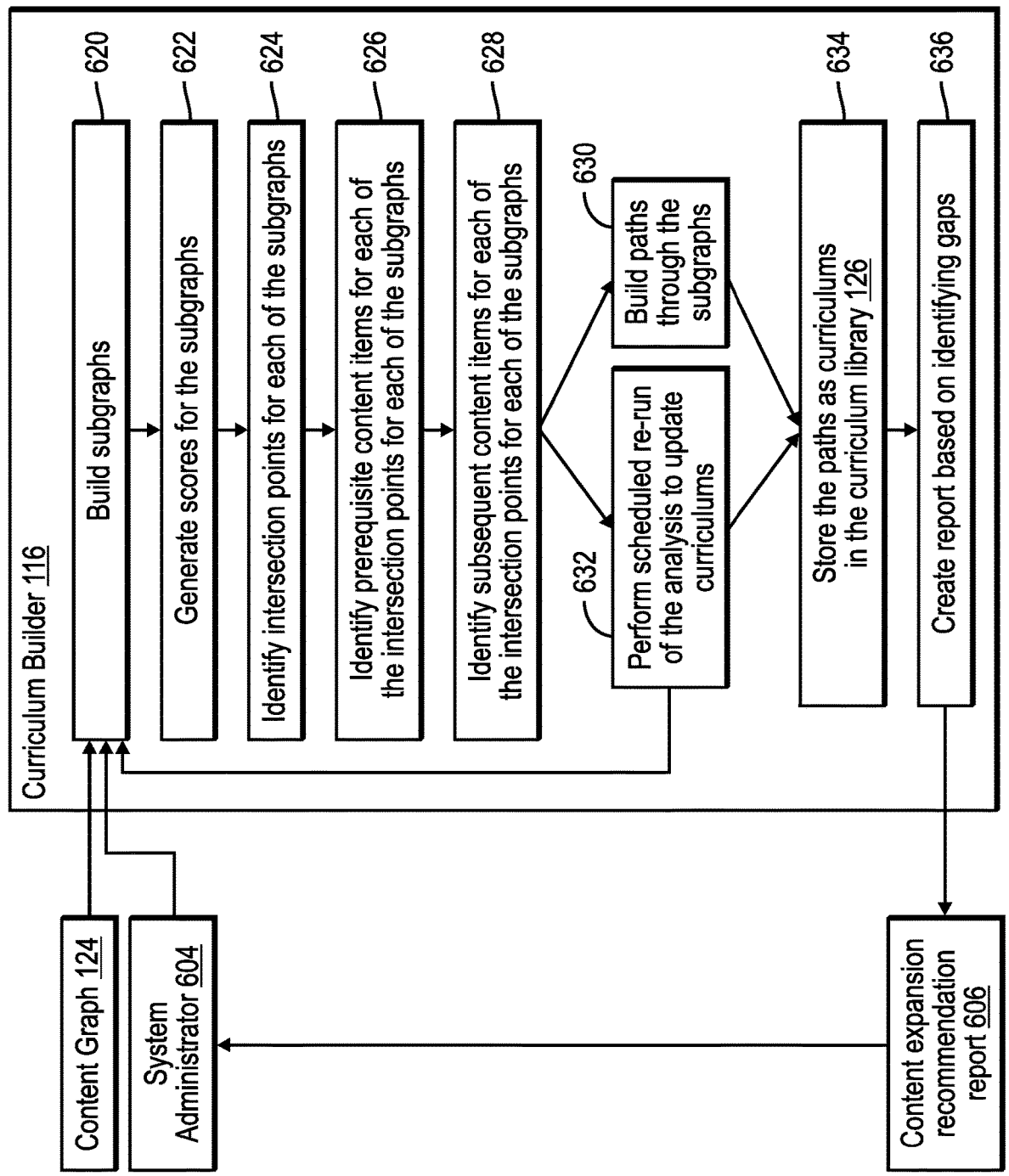
FIG. 6 illustrates, in a flowchart, operations performed by a curriculum builder in accordance with certain embodiments.

FIG. 6 illustrates, in a flowchart, operations performed by the curriculum builder 116 in accordance with certain embodiments. Control begins with the curriculum builder 116 building subgraphs based on the content graph 124 and input from a system administrator 604 (block 620). In certain embodiments, the curriculum builder 116 identifies the subgraphs based on the membership of each content item to a specific group or combination of groups. In certain embodiments, the curriculum builder 116 identifies the subgraphs based on one or more subjects (e.g., topics). In certain embodiments, the system administrator 604 may input a priority or indicate a focus of groups to be addressed and may define a minimum viable score of the subgraph. The view edges may be taken into account while selecting the subgraphs to reflect user defined learning paths. Existing curriculums may also be considered during the subgraph creation (e.g., may be added as curriculum edges).

After the subgraphs are identified, the curriculum builder 116 generates scores for the subgraphs (block 622). In certain embodiments, the curriculum builder 116 applies a score to each subgraph based on the groups' priorities, a count of content item vertices, median content item ranks, and counts of views.

In certain embodiments, the curriculum builder 116 selects the subgraphs with a score above a minimum threshold (e.g., set by the system administrator 604 or other user). Then, for each of the selected subgraphs, the curriculum builder 116 performs the operations of blocks 624-636.

The curriculum builder 116 identifies intersection points for each of the subgraphs (block 624). The "intersection point" may be described as a content item ("intersection content item") with a highest combination of rank, views, and mentioned/defined edges that is a focus point of the curriculum. That is, the intersection point may be the most connected and highly ranked content item. In certain embodiments, the number of intersection points is limited (e.g., no more than three intersection points for a subgraph with more than twenty content item vertices) to limit the number of possible curriculum combinations. There may be a single intersection point identified for each experience level.

The curriculum builder 116 identifies prerequisite content items for the intersection points of each of the subgraphs (block 626). For each of the intersection points, the curriculum builder 116 identifies prerequisite content items by selecting vertices that have "defined" type connections to the terms mentioned in the intersection points (i.e., prerequisite vertex to defined edge to term vertex to mention edge to intersection point). That is, the prerequisites may be content items that most often refer to the intersection point. From vertices that have the "defined type" connections, the curriculum builder 116 selects the prerequisite content items that are top matches based on rank, view count, context match, confidence level, and number of connections identified (through one or more terms). This processing may be repeated on already identified prerequisite vertices to extend the curriculum.

The curriculum builder 116 identifies subsequent content items for the intersection points of each of the subgraphs (block 628). For each of the intersection points, the curriculum builder 116 identifies the subsequent content items by selecting vertices that have "mentioned" type connections to the terms defined in the intersection points (intersection point vertex to defined edge to term vertex to mention edge to subsequent vertex). That is, the subsequent content may be content items that are referred to most by the intersection point. From vertices that have the "mentioned" type connections, the curriculum builder 116 selects the subsequent content items that are top matches based on rank, view count, context match, confidence level, and number of connections identified (through one or more terms). This processing may also be repeated on already identified subsequent vertices to extend the curriculum.

The curriculum builder 116 builds optimal paths through the subgraphs (block 630). In certain embodiments, the curriculum builder 116 builds optimal paths between the selected vertices (i.e., the selected vertices having "defined" type connections or "mentioned" type connections) for each experience level. In certain embodiments, this may be solved as a graph route problem taking the following parameters to rank the edges: rank of the content and confidence levels assigned to the edges, users' view history, experience level, etc. The curriculum builder 116 stores the optimal paths as curriculums in the curriculum library 126 (block 634).

The curriculum builder 116 creates a report (a content expansion recommendation report 606) by identifying gaps (block 636). In particular, the curriculum builder 116 identifies possible improvements in the content data store 120. The curriculum builder 116 identifies terms that have no definition for one or more experience levels. In certain embodiments, the curriculum builder 116 selects the term vertices that have the most "mention" edges connected to them and that have one or more experience level parameters marked as "not covered" or "to be improved". The, the curriculum builder consolidates the identified terms, the respective context of the identified terms (e.g., most used, least covered, etc.) and content items in which the identified terms were mentioned into a single content expansion recommendation report 606 that is set to the system administrator 604. The content expansion recommendation report 606 may also be distributed among content item creators or to a system administrator for enriching and improving the content data store 120.

In certain embodiments, the curriculum builder 116 generates additional reports for enhancing the maintenance process of the content data store 120, such as: a list of lowest ranked content (for removal or improvement), a list of new subjects (e.g., small subgroups that have no or limited connections to other content items, while having high ranks and views), potential cross subject content items for groups that have high numbers of connections through terms, but no or little content items that cover both subjects, etc.

The curriculum builder 116 performs scheduled re-runs of the analysis to update the curriculum (block 632).

Figure 7:
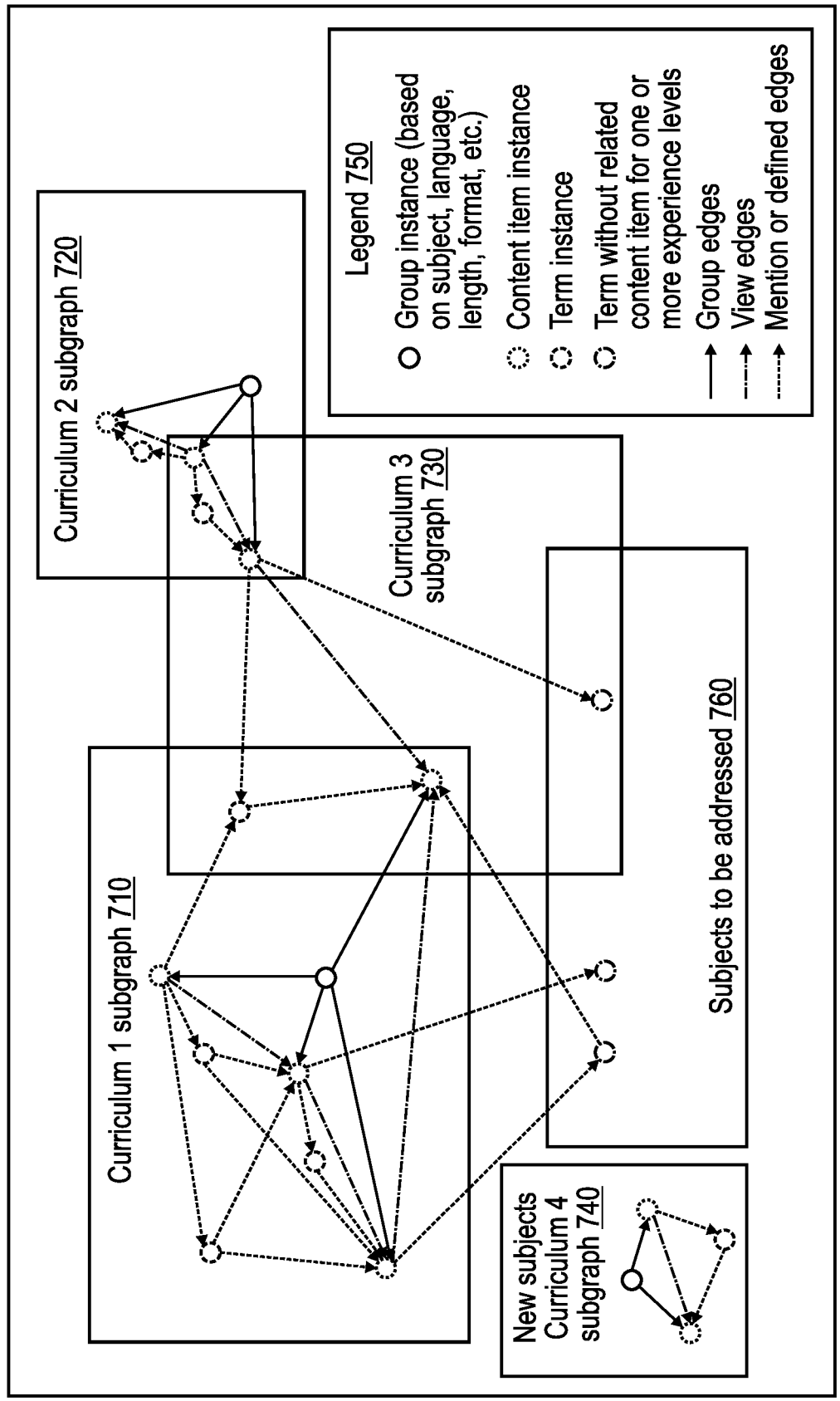
FIG. 7 illustrates an example of curriculum building in accordance with certain embodiments.

FIG. 7 illustrates an example of curriculum building in accordance with certain embodiments. FIG. 7 illustrates Curriculum 1 subgraph 710, Curriculum 2 720, Curriculum 3 subgraph 730, and Curriculum 4 subgraph 740. The legend 750 identifies the vertices and instances in the subgraphs. Also, box 760 identifies subjects to be addressed in the content data store 120.

Figure 8:
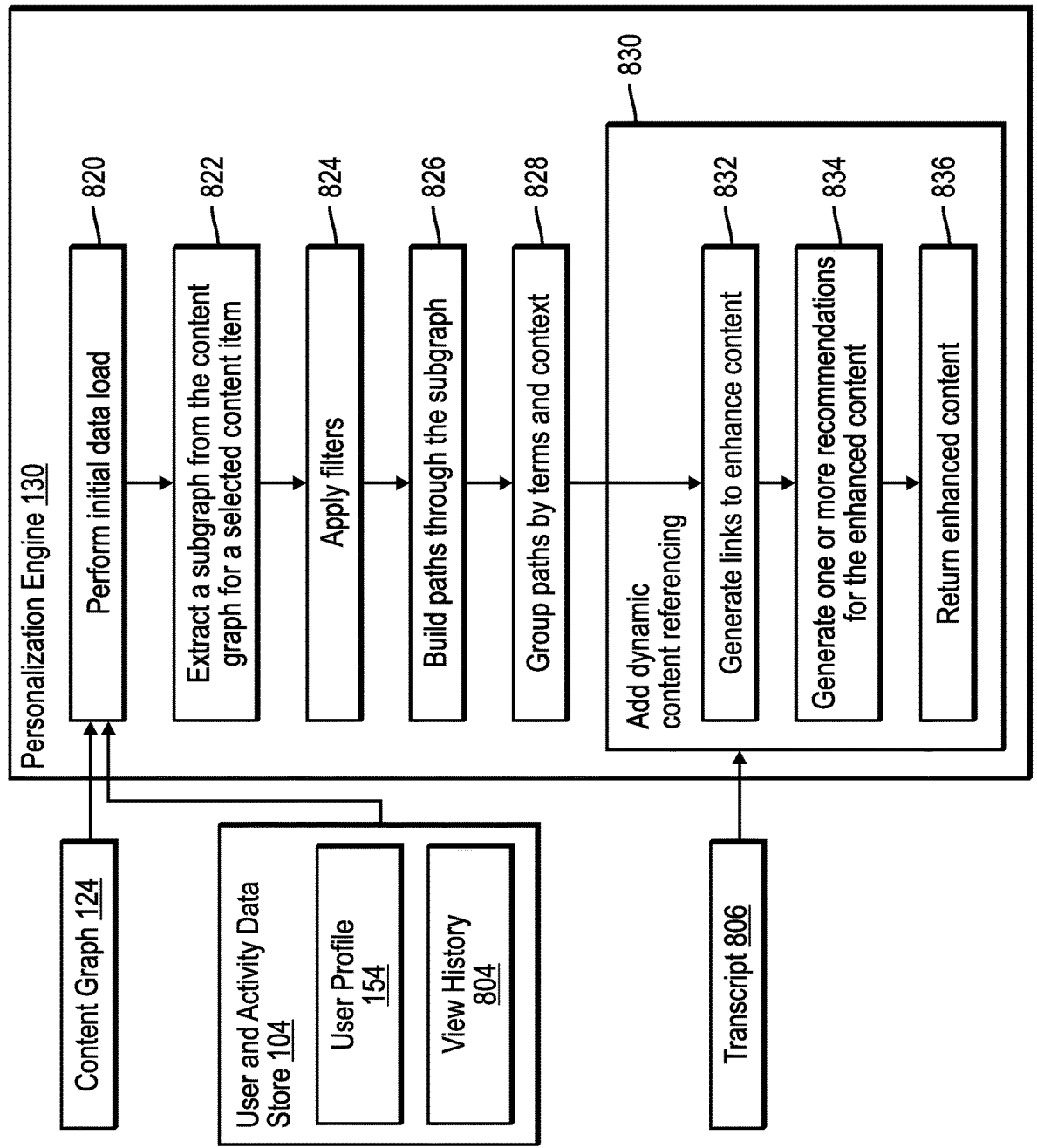
FIG. 8 illustrates, in a flowchart, operations performed by a personalization component in accordance with certain embodiments.

FIG. 8 illustrates, in a flowchart, operations performed by a personalization component 130 in accordance with certain embodiments. In certain embodiments, once initial analysis is completed on the remote server 100, the personalization component 130 may be invoked. The personalization component 130 may be triggered by user activity, such as login or load of a content page. The connector 170 consolidates and packages information, such as the user identifier, specific content page, and content item identifier. The connector sends this information to the remote server 100 for touting to the personalization component 130.

Control begins with the personalization component 130 performing an initial data load (block 820). The personalization component 130 loads data from a content graph 124 and from the user and activity data store 104, which includes the user profile 154 (which may include answers to user questionnaires on expertise and interests) and view history 804. In certain embodiments, the personalization component 130 loads data based on the profile associated with the user identifier and view history. The content graph 124 is loaded for the content item that the user has selected.

After the initial data is loaded, the personalization component 130 extracts a target subgraph from the content graph based on connection to the content item (block 822). For example, the personalization component 130 extracts a subgraph for a video content item. The content item (which was opened by the user and passed to the remote server 100 by the content item identifier) is marked in the subgraph as an "origin" content item vertex. The connection may be limited by the number of edges passed between the content item (e.g., two direct connections through a term, four second line connections, etc.) to reduce the size of the subgraph and improve the performance of the personalization component 130. The personalization component 130 adds, to the subgraph, an additional parameter to the content edges, to reflect whether the selected content item was viewed by the user.

After the subgraph is extracted, the personalization component 130 applies filters (block 824). For example, the personalization component 130 applies filters for: removing already viewed content items (i.e., previously watched content items), removing content items with lower experience levels than identified for the user (per term), and removing content item vertices that were left unconnected. In certain embodiments, the personalization component 130 may apply additional limitations based on the content groups (relation to group vertices) to limit specific language, preferred length of the content item, price, etc. For the edges, the confidence level is recalculated based on user preferences (e.g., language, duration (of a video content item), format, price, etc.), experience level, content, and connection ranks.

Once generic filters are applied, the personalization component 130 builds paths through the subgraph (block 826). A path may be formed by one or more edges. an example path may be: Video 1 (term x)→Video 2 (term X explained, term Y mentioned)→Video 3 (term Y explained). In certain embodiments, this may be solved as a graph route problem to select optimal connections in the subgraph based on context, experience level, content item length, content item rank, etc. In certain embodiments, the personalization component 130 identifies each "mentioned" edge coming from the origin content item vertex with an experience level above or equal to the user's experience level on the term as at least one "path". However, not all terms may have associated content items with the definition of the specific term that is being analyzed. Content items with experience levels below the user's experience level may be dropped, unless that is the available experience level available for that term or context item.

In certain embodiments, a term is a word or phrase used to describe a concept. Embodiments iterate over the terms in the content item to define paths. A term may be described as a keyword of a context. For example, if a certain Term X is mentioned in a content item, embodiments provide a definition for Term X as a reference, where the reference may be Content Item B. If a reference for the definition of Term X is not available in the content library 102, then embodiments identify Term X as a point for improvement in the content expansion recommendation report 606.

The personalization component 130 groups the paths by term and context combinations (block 828). In certain embodiments, the personalization component 130 drops low ranking paths (with confidence level below a certain threshold, e.g. <30%) unless no better path was identified for the term. Per each group (by term and context), the personalization component 130 stores the identified paths in relationship tables with the following columns: content item name, content item identifier, content item link, confidence level, duration (for a video content item), timestamp (of the term definition), segment duration (in which term definition is presented in the video content item), experience level in descending order of confidence level. A relationship table may be referred to as a recommendations table because it provides recommendations of other content items related to an intersection content item. The personalization component 130 passes the relationship table for adding dynamic content references (block 830).

For adding dynamic content references, the personalization component 130 receives the transcript 806 for the content item and generates links to enhance the content item (block 832) and generates one or more recommendations for the enhanced content item (block 834). In certain embodiments, the links may be hyperlinks. The personalization component 130 returns the enhanced content item (block 836).

For creating the links, in the transcript associated with the content item, for each term (based on "mention: edges coming from the origin content item), the personalization component 130 creates a link to the highest ranked content item from the relationship table for that specific term and context combination (which is identified from the edge metadata). In certain embodiments, the personalization component 130 adds links to the transcript 806 for identified terms that are a highest percent match from the user's experience level.

Then, the personalization component 130 uses the relationship table to generate the one or more recommendations. In certain embodiments, the personalization component 130 loads other matches as the one or more recommendations (i.e., one or more other suggestions) with an experience level mark.

Once the analysis is completed, the personalization component 130 sends the enhanced content item (e.g., which may have an associated transcript that includes links for terms) and the one or more recommendations to the connector 170 of the client 150. The connector 170 is able to provide the content item with the dynamic content references in the "enhanced" transcript and the one or more recommendations to the user.

In certain embodiments, the content graph and the curriculum library may be used for the dynamic content references and may also be used for tasks, such as: identification of prerequisite content items for the target content item and subsequent recommended materials (i.e., subsequent content items), creation of a personalized curriculum (learning path), a personalized home page view, etc.

FIGS. 9-14 illustrate a User Interface (UI) in accordance with certain embodiments. The UI includes various screens and controls (e.g., buttons). In certain embodiments, the content renderer 160 may be implemented as the UI.

Embodiments provide a UI that allows a user to access the additional functionality described herein. Although an example UI is described herein, in other embodiments, the UI may have a different format or structure and may be different for different content owners.

Initially, a UI at the client 150 allows a user to perform registration on the portal. In addition to general data, optionally, the user is asked to complete questionnaires on personal experience and interested topics. Completion of the questionnaires may be done at any time. In certain embodiments, the questionnaires contain a set of terms (e.g., which may be specified by a system administrator or which may be the most frequently used terms from the content graph). From the general data and the completion of the questionnaire, embodiments generate the user profile. The user profile may be divided into two data sets (portions), such as personal information and other information. The personal information includes: a user name, a password, and other personal information. The other information in the user profile includes the completed questionnaire with answers, the activity history of the user, ranks provided by the user (user's feedback score). The user is able to access the activity history through the user profile.

Figure 9:
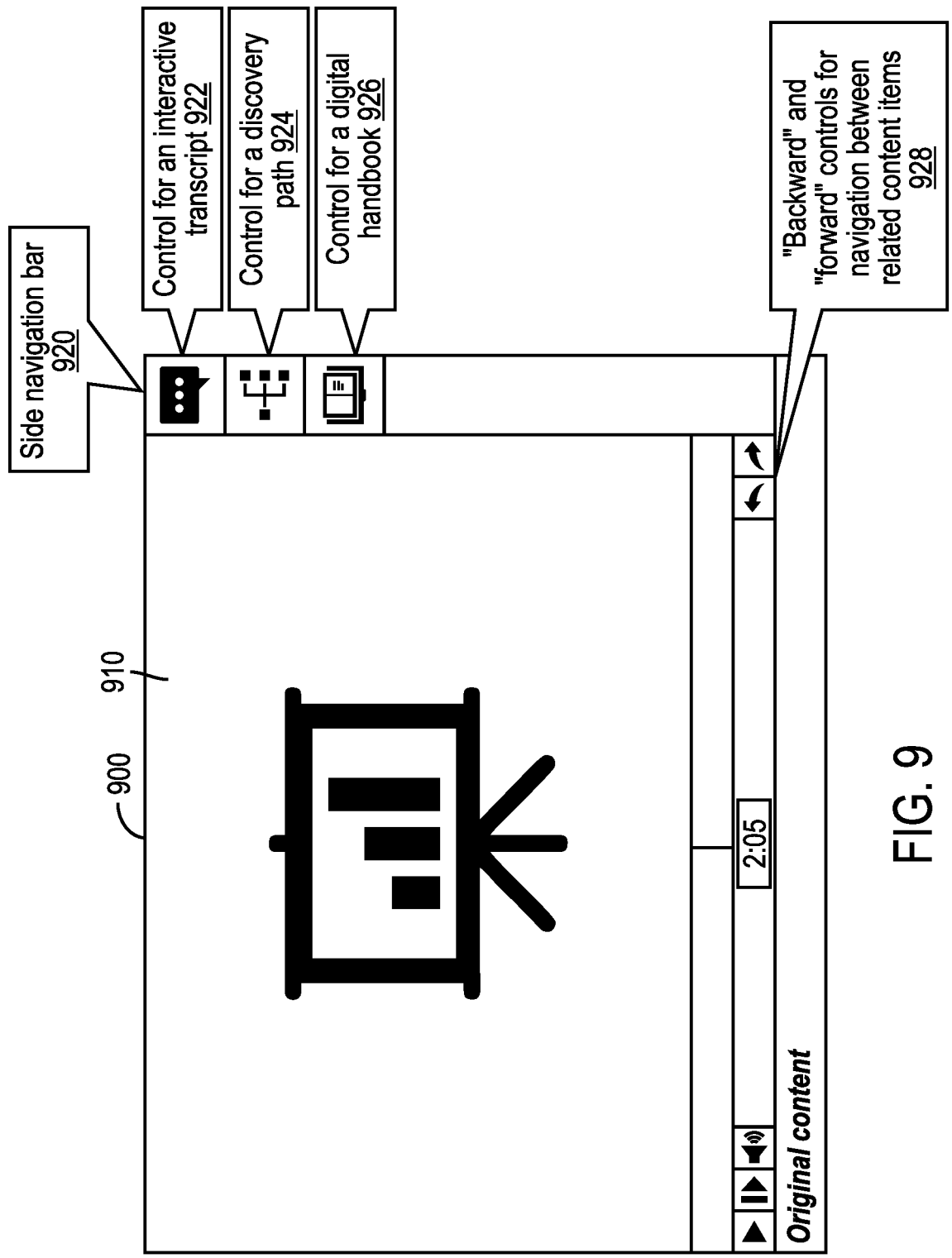
FIG. 9 illustrates a User Interface (UI) with an enhanced content item player in accordance with certain embodiments.

FIG. 9 illustrates a User Interface (UI) 900 with an enhanced content item player in accordance with certain embodiments. The UI 900 includes a player window 910 in which the content item is displayed and includes a side navigation bar 920 for accessing the enhanced functions. The side navigation bar 920 includes a control for an interactive transcript 922, a control for a discovery path 924, a control for a digital handbook 926, and controls 928 to move backwards and forwards between related content items. Additional controls 930 allow starting playing of the content item, pausing playing of the content item, and navigating (i.e., moving forwards and backwards) through the content item.

Figure 10:
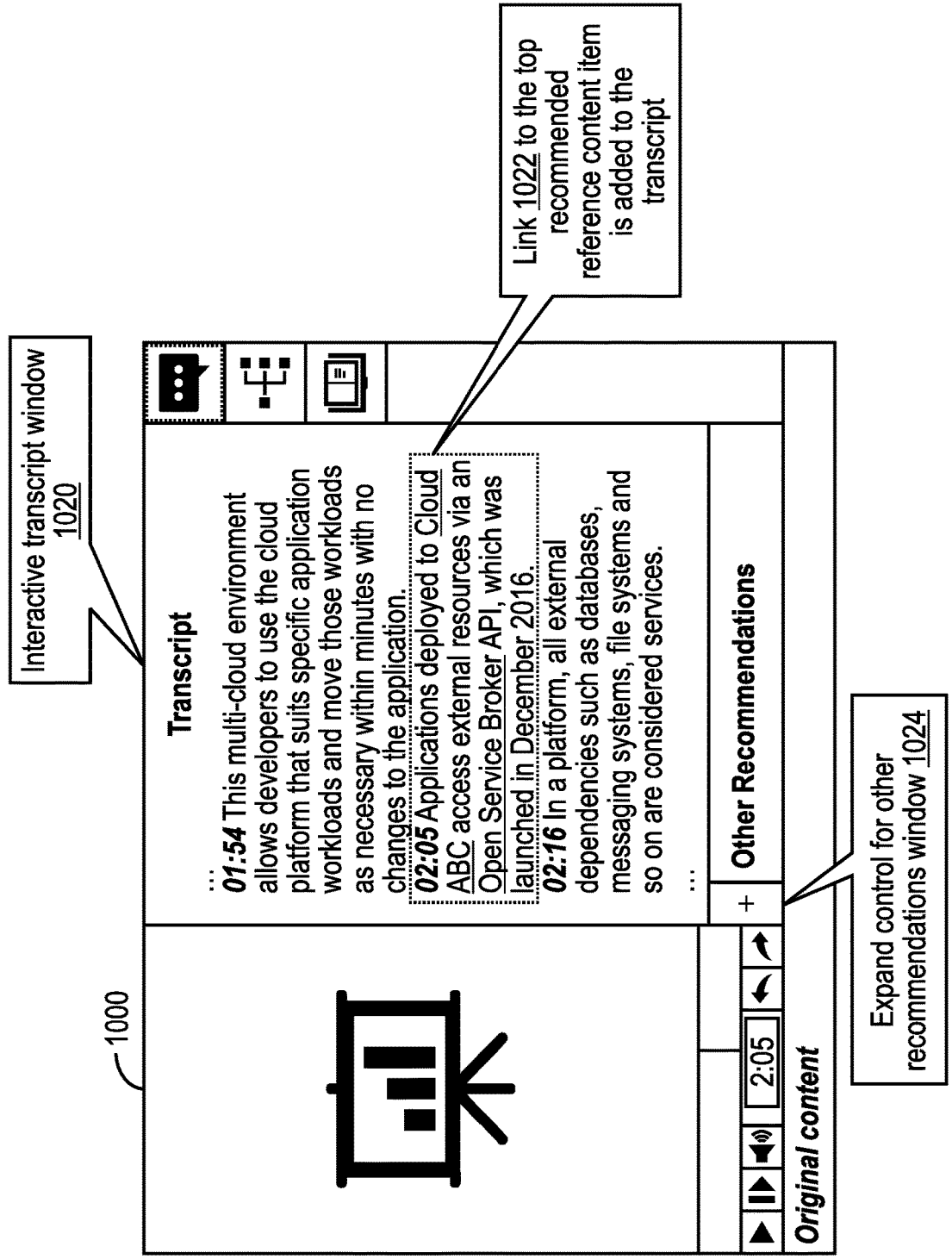
FIG. 10 illustrates a UI that is displayed in response to selection of a control for an interactive transcript in accordance with certain embodiments.

FIG. 10 illustrates a UI 1000 that is displayed in response to selection of the control for the interactive transcript 922 in accordance with certain embodiments. The UI 1000 provides an interactive transcript window 1020 that displays the content item transcript with timestamps and accessible links on certain terms (generated by the dynamic content reference process of FIG. 6). For example, a link 1022 is added to "Cloud ABC". In response to a user clicking on the link 1022, the content renderer 160 opens another video content item at a timestamp identified as a beginning of the term definition. The line of the transcript, correlated to a content item timestamp may be highlighted. Once the link 1022 is clicked, the content renderer 160 updates the discovery path to move the "active content item" marker to the referenced content item and mark the displayed content item as viewed. For each referenced content item loaded, the personalization component 130 of FIG. 8 on the remote server 100 to provide dynamic content reference links to the transcript for that content item.

The interactive transcript window 1020 also contains an expand control 1024 that provides a list of one or more recommended content items (e.g., the top other recommendations).

Figure 11:
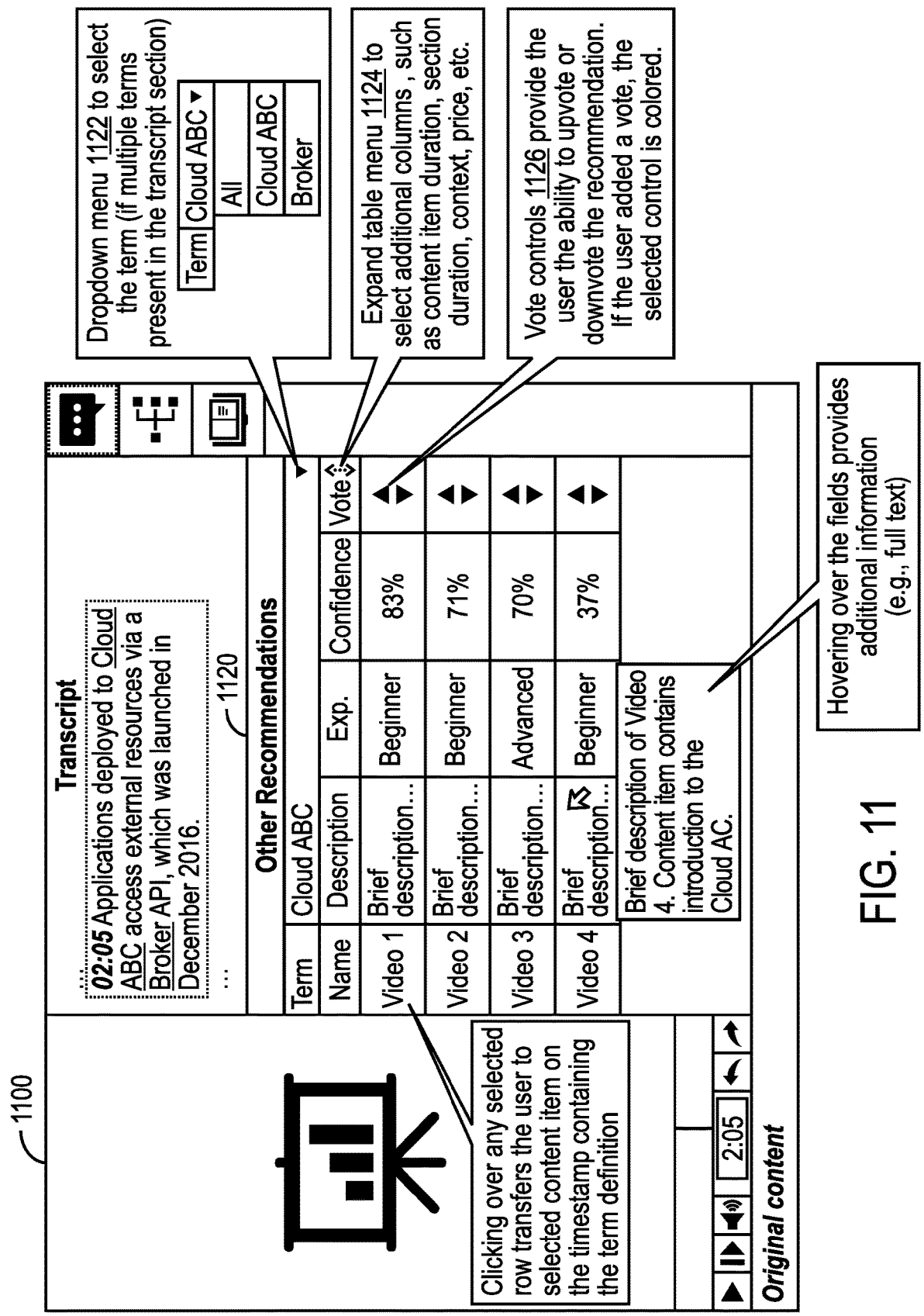
FIG. 11 illustrates a UI that is displayed in response to selection of an expand control in accordance with certain embodiments.

FIG. 11 illustrates a UI 1100 that is displayed in response to selection of the expand control 1024 in accordance with certain embodiments. The example UI 1100 includes a relationship table 1120. The relationship table 1120 includes a dropdown menu 1122 to select an item. In this example, the term "Cloud ABC" has been selected. In certain embodiments, the first line of the transcript shows the data on the content item referenced directly in the link. The relationship table 1120 provides, for each content item that references the term, a name, a description, an experience level, a confidence level, and a vote control 1126 for ranking. The relationship table 1120 includes an expand table menu 1124 to expand the table to see additional columns if there are additional columns.

In the relationship table 1120, for each content item, a user may use the vote control 1126 to influence the rating (rank) of recommended content. For example, if the user found that the content used in the link was not useful and would prefer not to get other recommendations like that, the user may use the vote control 1126 to downvote the link. Similarly, if the user found that the content used in the link was useful and would prefer to get other recommendations like that, the user may use the vote control 1126 to upvote the link. The user provided ranks are loaded to the content graph periodically to improve the content graph and the curriculums.

Figure 12:
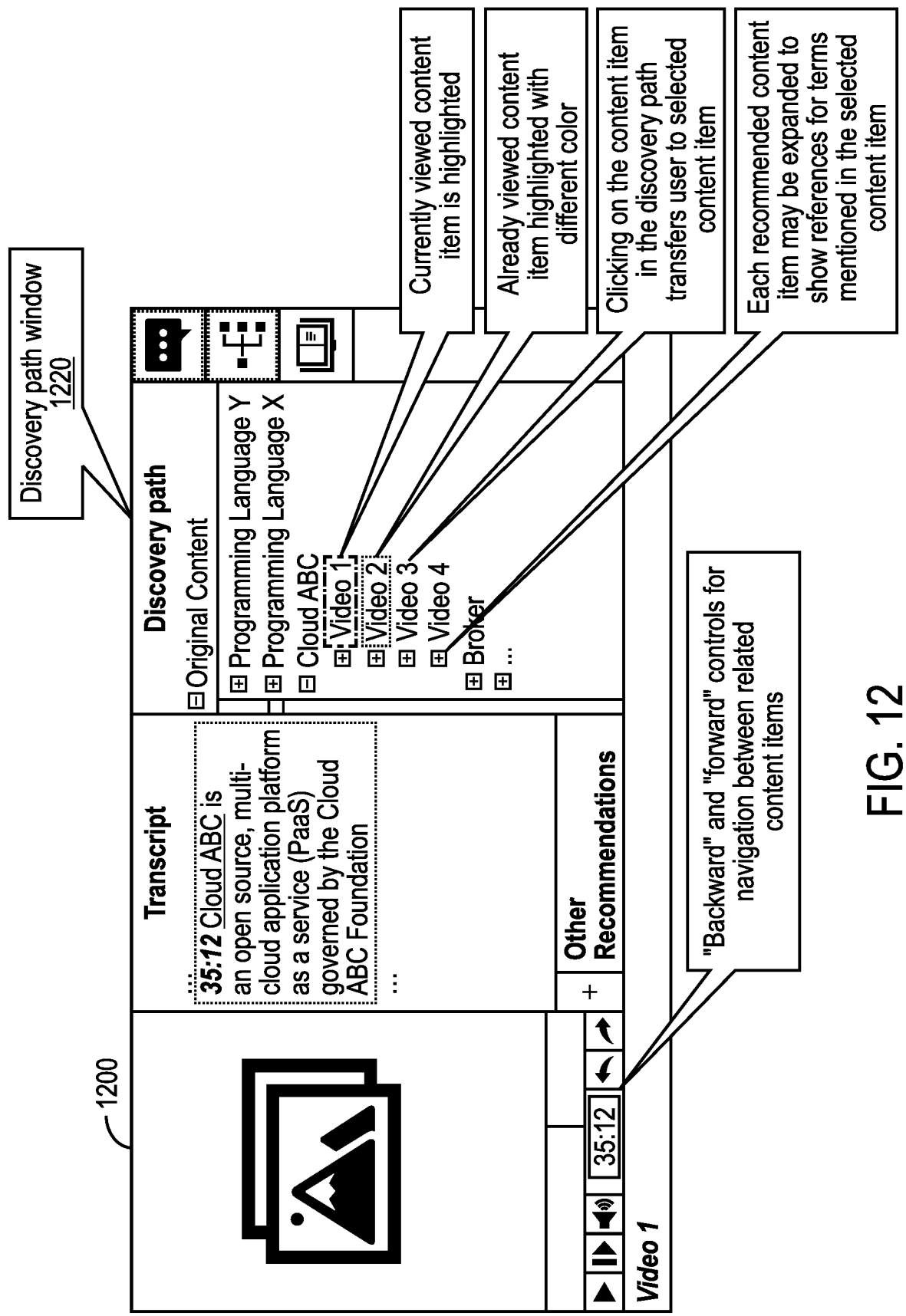
FIG. 12 illustrates a UI that is displayed in response to selection of a control for a discovery path in accordance with certain embodiments.

FIG. 12 illustrates a UI 1200 that is displayed in response to selection of the control for a discovery path 924 in accordance with certain embodiments. The discovery path window 1220 provides a visualization of the connection between content items in the form of a discovery tree 1222 and provides the user the ability to navigate between linked content items. The discovery tree includes the terms that have related content items identified for them. Under each term, the discovery tree is branched based on the context in which the term is mentioned, and, when going deeper into the list of referenced content items, the content items are provided in descending order based on their confidence levels. In this example, the top three recommendations are shown directly, while others are grouped together to improve the visibility. If the user selects a content item outside the top three recommendations, the selected content item is moved higher in the discovery tree for better visibility. By hovering over the content item in the discovery tree, the user is able to view more details, such as content description, rank, confidence level, duration, etc. By clicking on the content item in the discovery tree, the user is forwarded to the selected content item. Content items in the discovery tree that have been viewed (e.g., accessed through the transcript link or by navigation through the discovery path window) may be marked in the discovery tree with a different color. The modified discovery tree is saved automatically at each action taken and linked to the user profile (so that it may be accessed at the next session).

Figure 13:
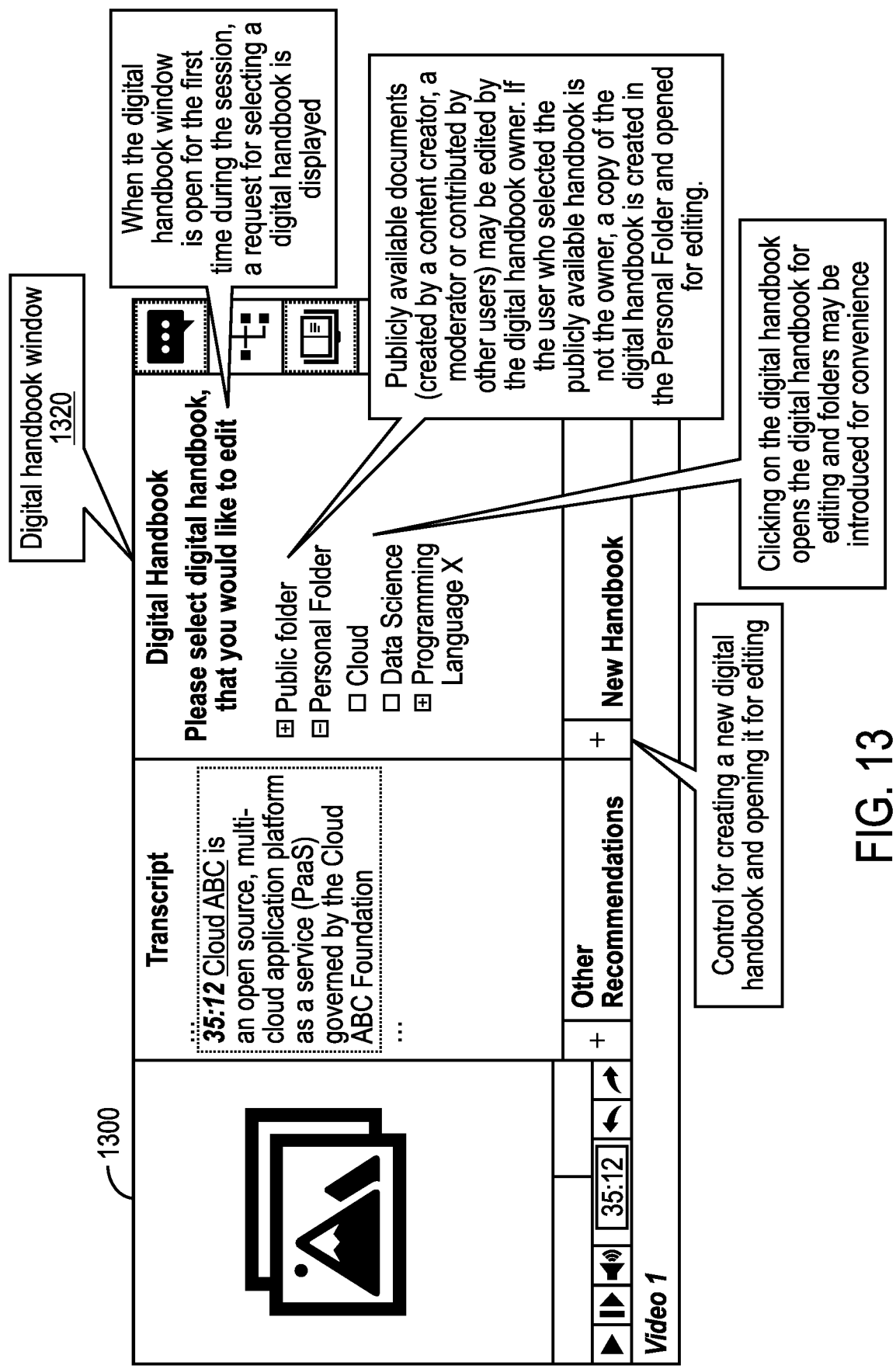
FIG. 13 illustrates a UI that is displayed in response to selection of a control for a digital handbook in accordance with certain embodiments.

FIG. 13 illustrates a UI 1300 that is displayed in response to selection of the control for a digital handbook 926 in accordance with certain embodiments. The UI 1300 includes a digital handbook window 1320. The digital handbook window 1320 provides the capability to organize viewed content items, store transcript capture, and add notes. In the digital handbook window, a quick access to the digital handbook is available. Once opened, the digital handbook window 1320 displays a request that asks user which handbook is to be opened or whether a new digital handbook is to be created. Once the digital handbook is selected, the content renderer 160 loads the content of the digital handbook.

Figure 14:
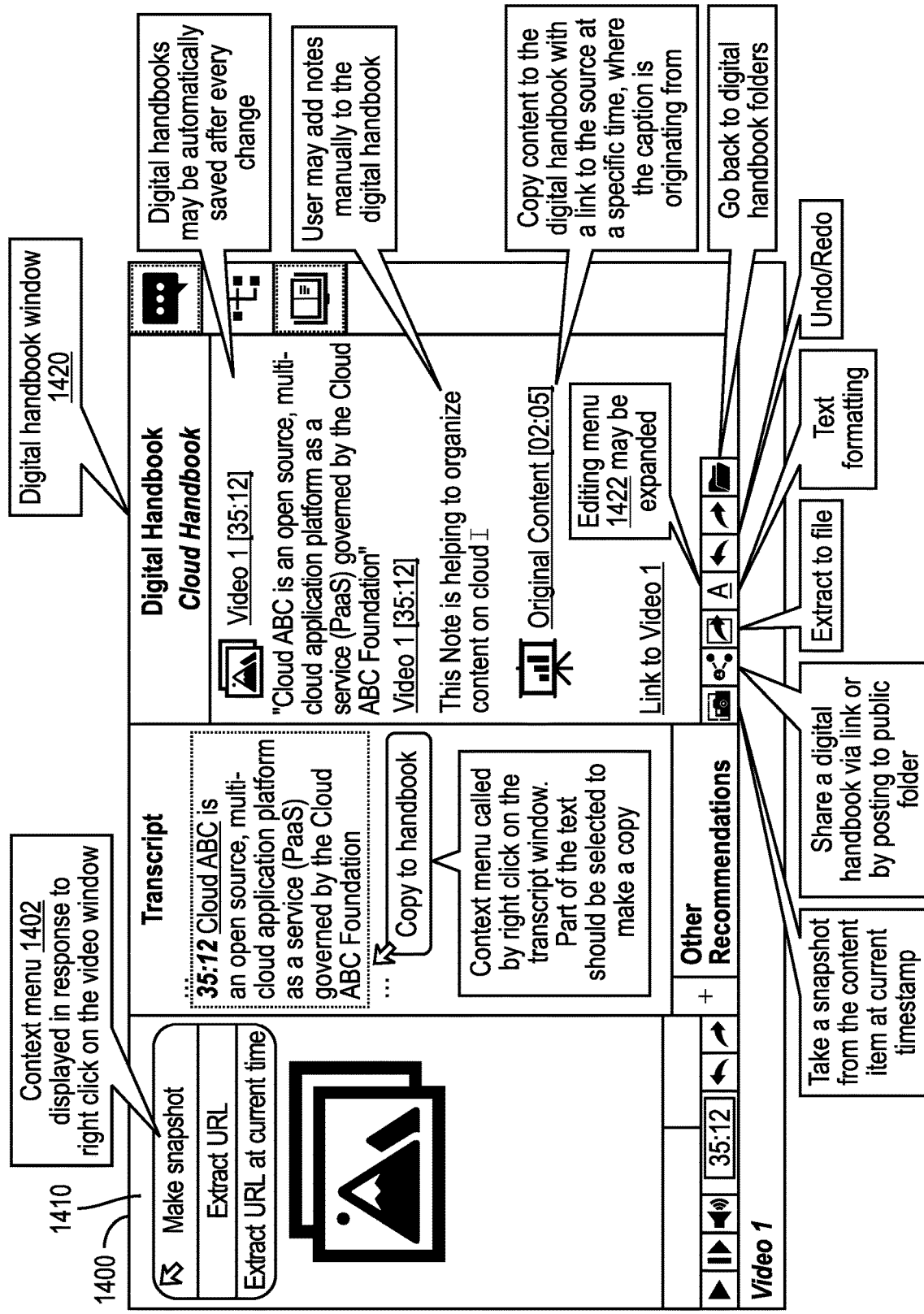
FIG. 14 illustrates a UI that is displayed in response to a digital handbook being selected in accordance with certain embodiments.

FIG. 14 illustrates a UI 1400 that is displayed in response to a digital handbook being selected in accordance with certain embodiments. For this example, the digital handbook for "Cloud" in FIG. 13 has been selected and is shown in the digital handbook window 1420. The digital handbook window includes an editing menu 1422. The player window 1410 displays a context menu 1412.

In FIG. 14, the user may copy a portion of the transcript to the digital handbook (e.g., by selecting the text in the interactive transcript window), and a link to the origin content item with the timestamp may be automatically added during the copy. The user may add a snapshot of the content item (e.g., by the function provided in the editing menu 1422). The user may link to the origin content item with the timestamp automatically added during the copy. The user may make additional notes directly in the digital handbook. In addition, the digital handbooks may be shared with other users or posted to the general public. The user may also access digital handbooks directly through the user profile. In addition, the editing menu 1412 provides expanded editing capabilities (e.g., creating tables, drawing, adding document structure (e.g., chapters), etc.).

In the example, the UI digital handbook takes a portion of the screen to give access to the content item, transcript, and other available views at the same time. However, in other embodiments, the digital handbook may be displayed contextually or on a separate page.

The digital handbook may be described as a comprehensive guide on a term using different digital properties (e.g., an image, a link, etc.) or multiple types of data (e.g., a video segment, a snapshot, a transcript, an image, a user note, etc.) to generate cross content item guides and help other users navigate through the term in different fields.

Figure 15:
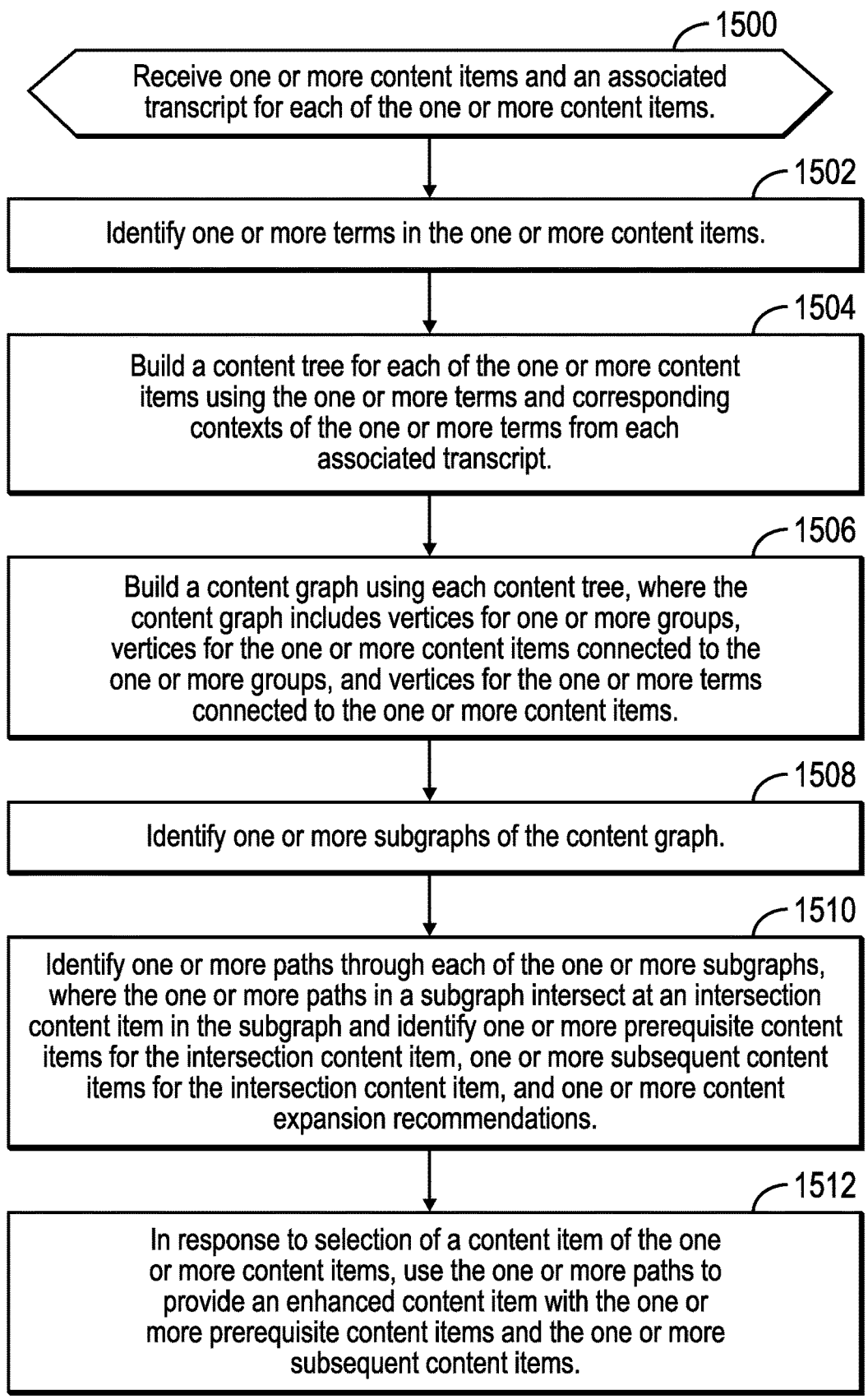
FIG. 15 illustrates, in a flowchart, operations performed to automatically create and provide curriculums in accordance with certain embodiments.

FIG. 15 illustrates, in a flowchart, operations performed to automatically create and provide curriculums in accordance with certain embodiments. Control beings at block 1500 with the enhanced learning component 110 receiving one or more content items and an associated transcript for each of the one or more content items. In block 1502, the enhanced learning component 110 identifies terms in the one or more content items. In block 1504, the enhanced learning component 110 builds a content tree for each of the one or more content items using the terms and the corresponding contexts of the terms from each associated transcript. In block 1506, the enhanced learning component 110 builds a content graph using each content tree, where the content graph includes vertices for one or more groups, the one or more content items connected to the one or more groups, and the one or more terms connected to the one or more content items. In block 1508, the enhanced learning component 110 identifies one or more subgraphs of the content graph. In block 1510, the enhanced learning component 110 identifies one or more paths through each of the one or more subgraphs, where the one or more paths in a subgraph intersect at a content item in the subgraph and identify one or more prerequisite content items for the intersection content item, one or more subsequent content items for the intersection content item, and one or more content expansion recommendations. In block 1512, in response to selection of a content item of the one or more content items, the enhanced learning component 110 uses the one or more paths to provide an enhanced content item with the one or more prerequisite content items and the one or more subsequent content items.

The one or more prerequisite content items, the enhanced content item, and then the one or more subsequent content items may be played by the content renderer 160.

Thus, embodiments provide automatic generation and analysis of the content graph to enable dynamic content references for content items and to build curriculums.

Embodiments provide the ability to do a personalized lookup for relevant content items within the context of a content item being played based on a timestamp and a section (of the content item). Embodiments provide the capability to interplay between the current and the looked-up content items (in the form of a discovery tree of content items). Embodiments enrich and increase accuracy of the content item for a given context over a period of time. Embodiments enrich the transcript with links to clarifying content items. Embodiments create curriculums dynamically. Embodiments automatically summarize a set of content items to create a digital handbook. Embodiments identify relationships between existing content items and provide recommendations for content item expansion.

More businesses are investing and adopting digital platforms as their primary collaboration channels (for digital events, such as webinars, online meetings, online collaboration, online learning, etc.). Embodiments provide innovative forms of digital interactions in domains in which content items, such as videos, are used for information dissemination (e.g., the education technology industry).

With embodiments, the digital handbook (a summarization of digital content) may be integrated into any digital event to enhance the users' digital experience. The digital handbook is also easier to consume than a webpage with many tracks and a lot of content.

Embodiments provide an automated mechanism for curriculum creation for large content databases, which avoids doing this manually (with significant time, effort, and cost).

In certain embodiments, a personalized lookup for relevant content items for a user within the context of a content item being played is provided. The lookup may be based on timestamp/section and automatically generates and analyzes a content graph to enable the dynamic content item references in a transcript and to build the curriculums. Embodiments store data, such as content items, transcripts, user feedback (which includes (content item ratings and recommendation ratings), a user profile, and a view history. Embodiments generate a content tree for each content item in a set of content items and a content graph for the set of content items, where the content graph reflects the relationships between the content items. Embodiments create curriculums based on analysis of the content graph. Then, the personalization component 130, while interacting with the user, selects a curriculum to recommend to the user based on the user profile and view history.

Figure 16:
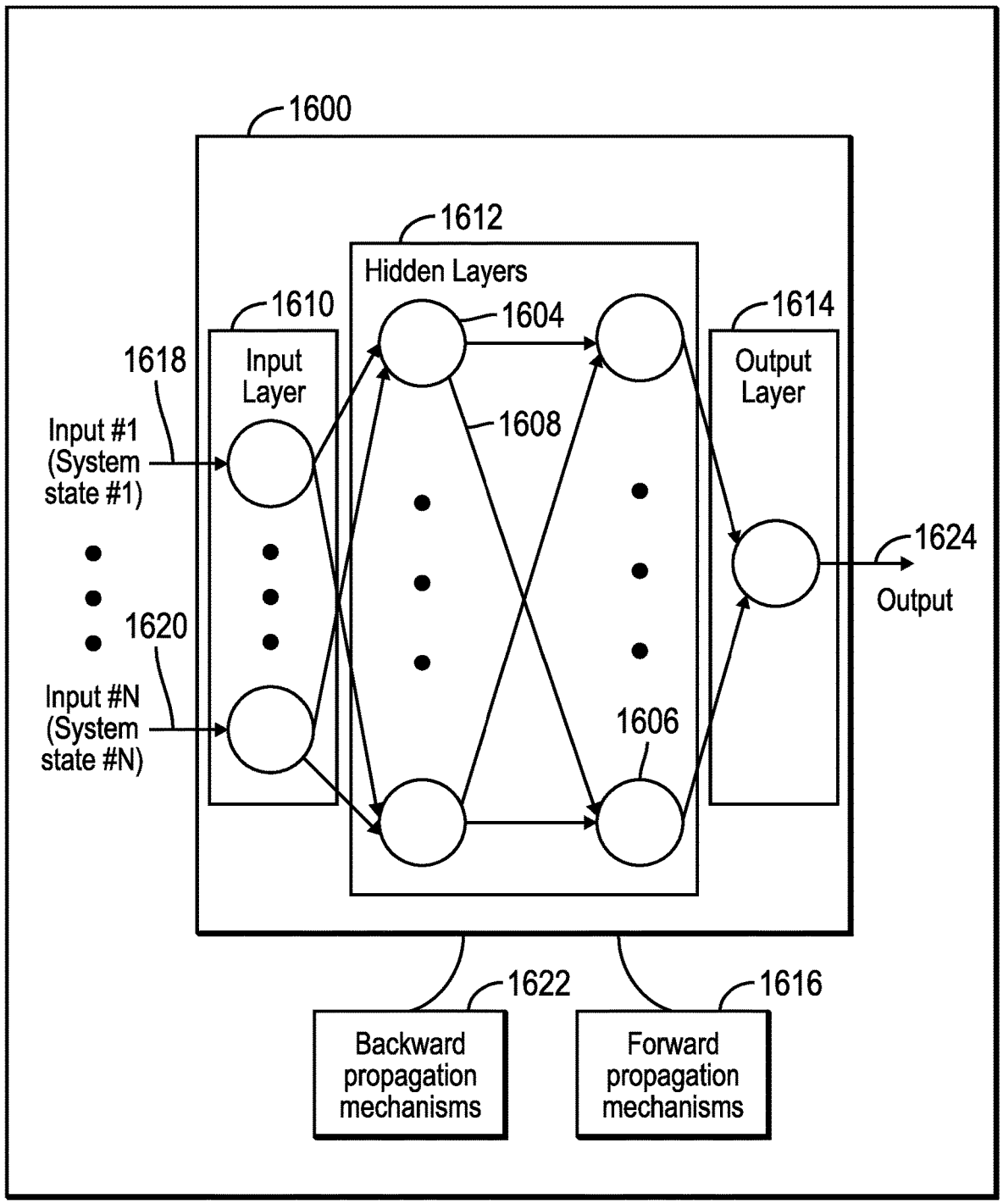
FIG. 16 illustrates, in a block diagram, details of a machine learning model in accordance with certain embodiments.

FIG. 16 illustrates, in a block diagram, details of a machine learning model 1600 in accordance with certain embodiments. In certain embodiments, the content analyzer, the content graph builder 114, the curriculum builder 116, and the personalization component 130 are each implemented using an instance of the machine learning model 1600.

The machine learning model 1600 may comprise a neural network with a collection of nodes with links connecting them, where the links are referred to as connections. For example, FIG. 16 shows a node 1604 connected by a connection 1608 to the node 1606. The collection of nodes may be organized into three main parts: an input layer 1610, one or more hidden layers 1612, and an output layer 1614.

The connection between one node and another is represented by a number called a weight, where the weight may be either positive (if one node excites another) or negative (if one node suppresses or inhibits another). Training the machine learning model 1600 entails calibrating the weights in the machine learning model 1600 via mechanisms referred to as forward propagation 1616 and backward propagation 1622. Bias nodes that are not connected to any previous layer may also be maintained in the machine learning model 1600. A bias may be described as an extra input of 1 with a weight attached to it for a node.

In forward propagation 1616, a set of weights are applied to the input data 1618 . . . 1620 to calculate the output 1624. For the first forward propagation, the set of weights may be selected randomly or set by, for example, a system administrator. That is, in the forward propagation 1616, embodiments apply a set of weights to the input data 1618 . . . 1620 and calculate an output 1624.

In backward propagation 1622 a measurement is made for a margin of error of the output 1624, and the weights are adjusted to decrease the error. Backward propagation 1622 compares the output that the machine learning model 1600 produces with the output that the machine learning model 1600 was meant to produce, and uses the difference between them to modify the weights of the connections between the nodes of the machine learning model 1600, starting from the output layer 1614 through the hidden layers 1612 to the input layer 1610, i.e., going backward in the machine learning model 1600. In time, backward propagation 1622 causes the machine learning model 1600 to learn, reducing the difference between actual and intended output to the point where the two come very close or coincide.

The machine learning model 1600 may be trained using backward propagation to adjust weights at nodes in a hidden layer to produce adjusted output values based on the provided inputs 1618 . . . 1620. A margin of error may be determined with respect to the actual output 1624 from the machine learning model 1600 and an expected output to train the machine learning model 1600 to produce the desired output value based on a calculated expected output. In backward propagation, the margin of error of the output may be measured and the weights at nodes in the hidden layers 1612 may be adjusted accordingly to decrease the error.

Backward propagation may comprise a technique for supervised learning of artificial neural networks using gradient descent. Given an artificial neural network and an error function, the technique may calculate the gradient of the error function with respect to the artificial neural network's weights.

Thus, the machine learning model 1600 is configured to repeat both forward and backward propagation until the weights of the machine learning model 1600 are calibrated to accurately predict an output.

The machine learning model 1600 implements a machine learning technique such as decision tree learning, association rule learning, artificial neural network, inductive programming logic, support vector machines, Bayesian models, etc., to determine the output value 1624.

In certain machine learning model 1600 implementations, weights in a hidden layer of nodes may be assigned to these inputs to indicate their predictive quality in relation to other of the inputs based on training to reach the output value 1624.

With embodiments, the machine learning model 1600 is a neural network, which may be described as a collection of "neurons" with "synapses" connecting them.

With embodiments, there may be multiple hidden layers 1612, with the term "deep" learning implying multiple hidden layers. Hidden layers 1612 may be useful when the neural network has to make sense of something complicated, contextual, or non-obvious, such as image recognition. The term "deep" learning comes from having many hidden layers. These layers are known as "hidden", since they are not visible as a network output.

In certain embodiments, training a neural network may be described as calibrating all of the "weights" by repeating the forward propagation 1616 and the backward propagation 1622.

In backward propagation 1622, embodiments measure the margin of error of the output and adjust the weights accordingly to decrease the error.

Neural networks repeat both forward and backward propagation until the weights are calibrated to accurately predict the output 1624.

In certain embodiments, the machine learning model 1600 may be refined based on whether the outputted recommendations, once taken, generate positive outcomes.

In certain embodiments, for a content analyzer machine learning model, the inputs to the machine learning model 1600 are a content item and a transcript for the content item, and the output of the machine learning model 1600 is a content tree.

In certain embodiments, for a graph builder machine learning model, the inputs to the machine learning model 1600 are content items, content trees and system administrator inputs, and the output of the machine learning model 1600 is a content graph.

In certain embodiments, for a curriculum creator machine learning model, the inputs to the machine learning model 1600 are the content graph and system administrator inputs, and the output of the machine learning model 1600 is one or more paths forming curriculums with one or more prerequisite content items, the intersection point content item, and one or more subsequent content items.

In certain embodiments, for a personalization component machine learning model, the inputs to the machine learning model 1600 are the content graph, a user profile, a view history, a transcript, content trees, and the curriculum library, and the output of the machine learning model 1600 are one or more paths and an enhanced content item, where each of the one or more paths include one or more prerequisite content items, the intersection content item, and one or more subsequent content items, and where each term in the enhanced content item is accompanied with one or more references.

Figure 17:
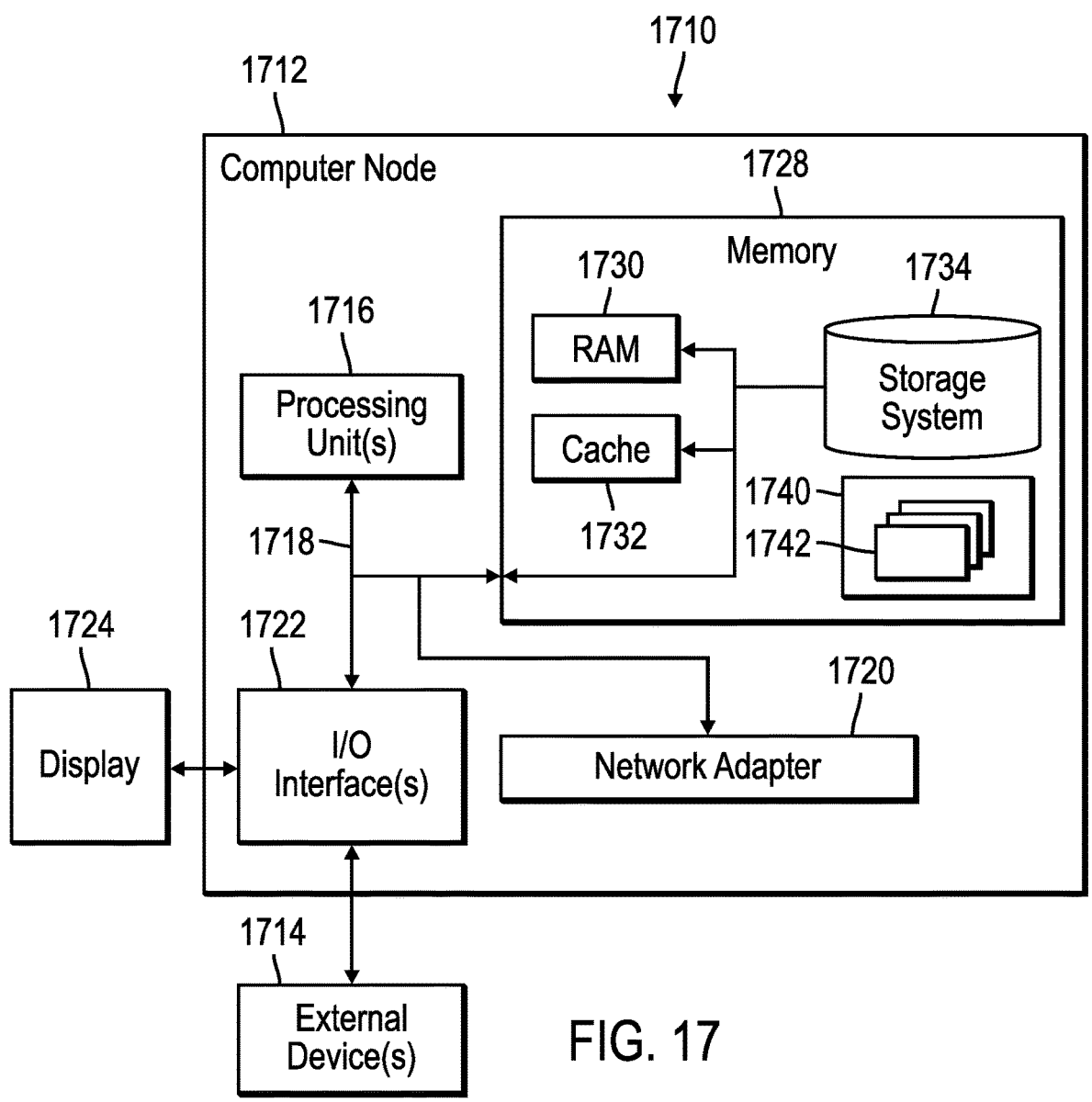
FIG. 17 illustrates a computing node in accordance with certain embodiments.

FIG. 17 illustrates a computing environment 1710 in accordance with certain embodiments. In certain embodiments, the computing environment is a cloud computing environment. Referring to FIG. 17, computer node 1712 is only one example of a suitable computing node and is not intended to suggest any limitation as to the scope of use or functionality of embodiments of the invention described herein. Regardless, computer node 1712 is capable of being implemented and/or performing any of the functionality set forth hereinabove.

The computer node 1712 may be a computer system, which is operational with numerous other general purpose or special purpose computing system environments or configurations. Examples of well-known computing systems, environments, and/or configurations that may be suitable for use with computer node 1712 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer node 1712 may be described in the general context of computer system executable instructions, such as program modules, being executed by a computer system. Generally, program modules may include routines, programs, objects, components, logic, data structures, and so on that perform particular tasks or implement particular abstract data types. Computer node 1712 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 17, computer node 1712 is shown in the form of a general-purpose computing device. The components of computer node 1712 may include, but are not limited to, one or more processors or processing units 1716, a system memory 1728, and a bus 1718 that couples various system components including system memory 1728 to one or more processors or processing units 1716.

Bus 1718 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer node 1712 typically includes a variety of computer system readable media. Such media may be any available media that is accessible by computer node 1712, and it includes both volatile and non-volatile media, removable and non-removable media.

System memory 1728 can include computer system readable media in the form of volatile memory, such as random access memory (RAM) 1730 and/or cache memory 1732. Computer node 1712 may further include other removable/non-removable, volatile/non-volatile computer system storage media. By way of example only, storage system 1734 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a compact disc read-only memory (CD-ROM), digital versatile disk read-only memory (DVD-ROM) or other optical media can be provided. In such instances, each can be connected to bus 1718 by one or more data media interfaces. As will be further depicted and described below, system memory 1728 may include at least one program product having a set (e.g., at least one) of program modules that are configured to carry out the functions of embodiments of the invention.

Program/utility 1740, having a set (at least one) of program modules 1742, may be stored in system memory 1728 by way of example, and not limitation, as well as an operating system, one or more application programs, other program modules, and program data. Each of the operating system, one or more application programs, other program modules, and program data or some combination thereof, may include an implementation of a networking environment. Program modules 1742 generally carry out the functions and/or methodologies of embodiments of the invention as described herein.

Computer node 1712 may also communicate with one or more external devices 1714 such as a keyboard, a pointing device, a display 1724, etc.; one or more devices that enable a user to interact with computer node 1712; and/or any devices (e.g., network card, modem, etc.) that enable computer node 1712 to communicate with one or more other computing devices. Such communication can occur via Input/Output (I/O) interfaces 1722. Still yet, computer node 1712 can communicate with one or more networks such as a local area network (LAN), a general wide area network (WAN), and/or a public network (e.g., the Internet) via network adapter 1720. As depicted, network adapter 1720 communicates with the other components of computer node 1712 via bus 1718. It should be understood that although not shown, other hardware and/or software components could be used in conjunction with computer node 1712. Examples, include, but are not limited to: microcode, device drivers, redundant processing units, external disk drive arrays, Redundant Array of Inexpensive Disks (RAID) systems, tape drives, and data archival storage systems, etc.

In certain embodiments, the remote server 100 and the client 150 each have the architecture of computer node 1712. In certain embodiments, the remote server 100 and the client 150 are part of a cloud infrastructure. In certain alternative embodiments, the remote server 100 and the client 150 are not part of a cloud infrastructure.

Cloud Embodiments

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 18:
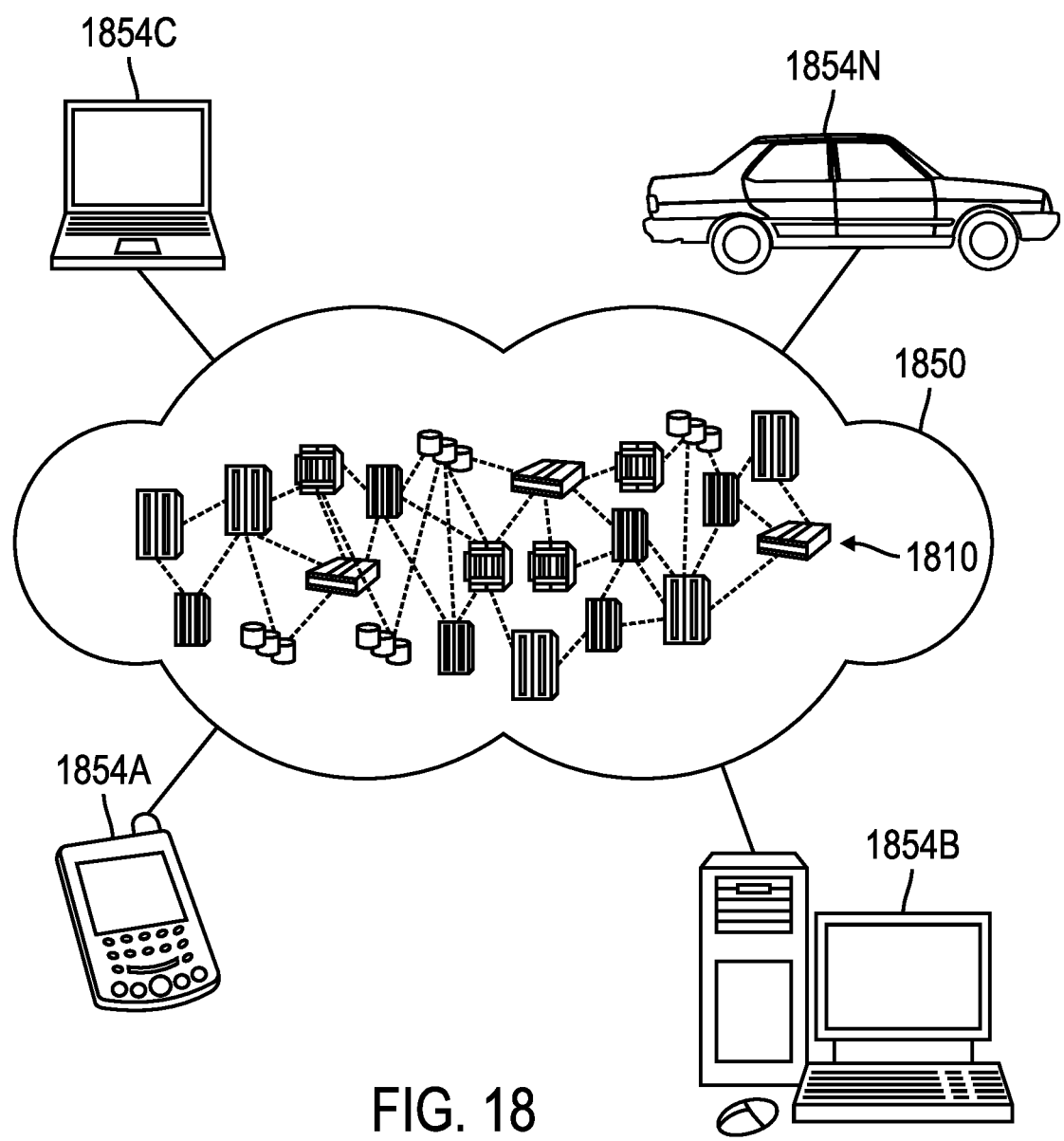
FIG. 18 illustrates a cloud computing environment in accordance with certain embodiments.

Referring now to FIG. 18, illustrative cloud computing environment 1850 is depicted. As shown, cloud computing environment 1850 includes one or more cloud computing nodes 1810 with which local computing devices used by cloud consumers, such as, for example, personal digital assistant (PDA) or cellular telephone 1854A, desktop computer 1854B, laptop computer 1854C, and/or automobile computer system 1854N may communicate. Nodes 1810 may communicate with one another. They may be grouped (not shown) physically or virtually, in one or more networks, such as Private, Community, Public, or Hybrid clouds as described hereinabove, or a combination thereof. This allows cloud computing environment 1850 to offer infrastructure, platforms and/or software as services for which a cloud consumer does not need to maintain resources on a local computing device. It is understood that the types of computing devices 1854A-N shown in FIG. 18 are intended to be illustrative only and that computing nodes 1810 and cloud computing environment 1850 can communicate with any type of computerized device over any type of network and/or network addressable connection (e.g., using a web browser).

Figure 19:
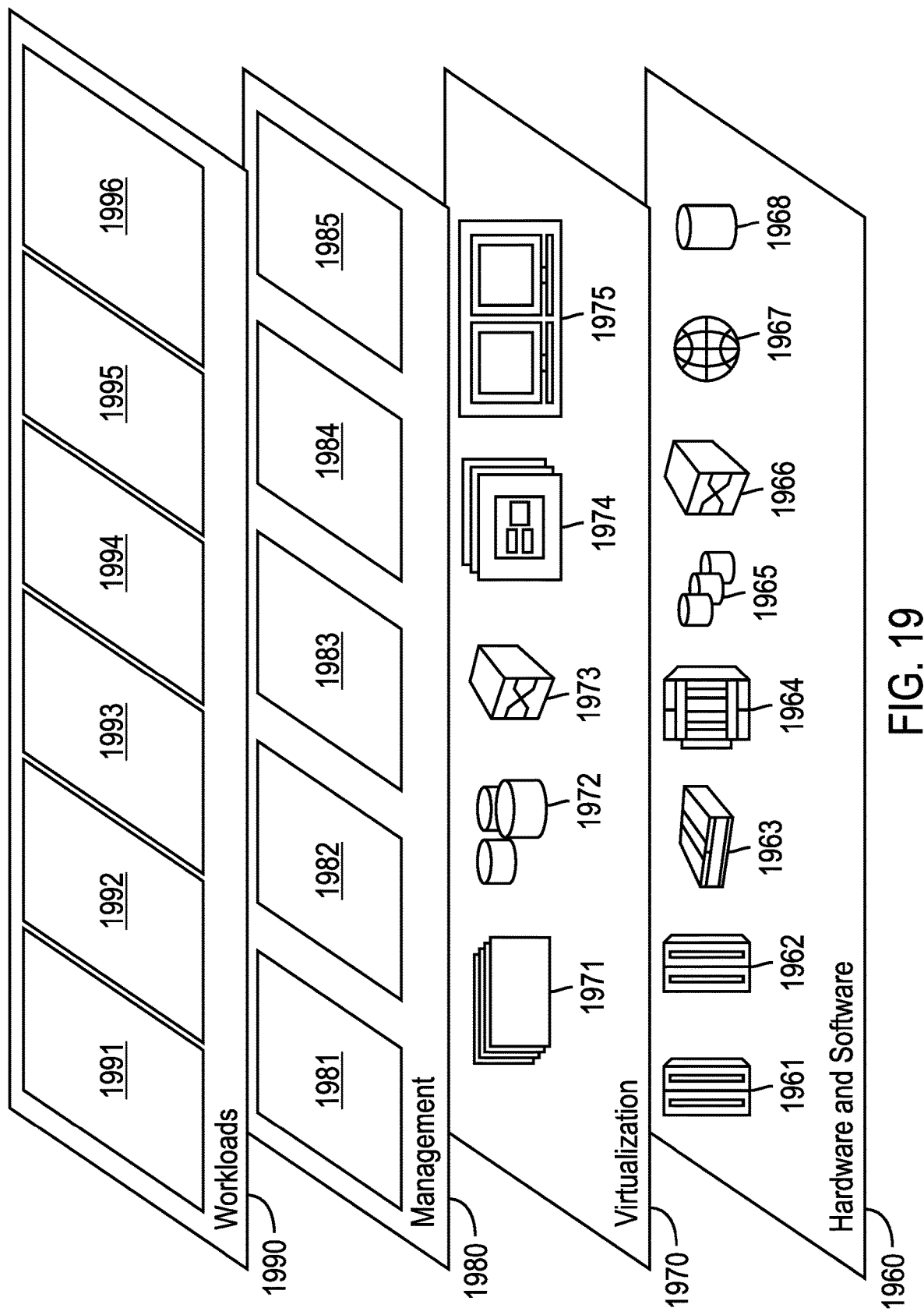
FIG. 19 illustrates abstraction model layers in accordance with certain embodiments.

Referring now to FIG. 19, a set of functional abstraction layers provided by cloud computing environment 1850 (FIG. 18) is shown. It should be understood in advance that the components, layers, and functions shown in FIG. 19 are intended to be illustrative only and embodiments of the invention are not limited thereto. As depicted, the following layers and corresponding functions are provided:

Hardware and software layer 1960 includes hardware and software components. Examples of hardware components include: mainframes 1961; RISC (Reduced Instruction Set Computer) architecture based servers 1962; servers 1963; blade servers 1964; storage devices 1965; and networks and networking components 1966. In some embodiments, software components include network application server software 1967 and database software 1968.

Virtualization layer 1970 provides an abstraction layer from which the following examples of virtual entities may be provided: virtual servers 1971; virtual storage 1972; virtual networks 1973, including virtual private networks; virtual applications and operating systems 1974; and virtual clients 1975.

In one example, management layer 1980 may provide the functions described below. Resource provisioning 1981 provides dynamic procurement of computing resources and other resources that are utilized to perform tasks within the cloud computing environment. Metering and Pricing 1982 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 1983 provides access to the cloud computing environment for consumers and system administrators. Service level management 1984 provides cloud computing resource allocation and management such that required service levels are met. Service Level Agreement (SLA) planning and fulfillment 1985 provide pre-arrangement for, and procurement of, cloud computing resources for which a future requirement is anticipated in accordance with an SLA.

Workloads layer 1990 provides examples of functionality for which the cloud computing environment may be utilized. Examples of workloads and functions which may be provided from this layer include: mapping and navigation 1991; software development and lifecycle management 1992; virtual classroom education delivery 1993; data analytics processing 1994; transaction processing 1995; and automatically enhancing content items through identifying relationships 1996.

Thus, in certain embodiments, software or a program, implementing automatically enhancing content items through identifying relationships, in accordance with embodiments described herein, is provided as a service in a cloud environment.

Additional Embodiment Details

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

In the described embodiment, variables a, b, c, i, n, m, p, r, etc., when used with different elements may denote a same or different instance of that element.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, embodiments of the invention reside in the claims herein after appended.

The foregoing description provides examples of embodiments of the invention, and variations and substitutions may be made in other embodiments.

What is claimed is:

1. A computer-implemented method, comprising operations for:
    receiving one or more content items and an associated transcript for each of the one or more content items;
    identifying one or more terms in the one or more content items;
    training a content analyzer machine learning model by calibrating first weights;
    using the trained content analyzer machine learning model that receives inputs of the one or more content items and each associated transcript and outputs a content tree for each of the one or more content items, wherein the content tree comprises first vertices and first edges, and wherein an edge to a vertex of the first vertices for a term of the one or more terms comprises an indication of whether the term is one of defined and mentioned;
    training a graph builder machine learning model by calibrating second weights;
    using the trained graph builder machine learning model that receives inputs of the one or more content items and each content tree output by the content analyzer machine learning model and outputs to build a content graph, wherein the content graph comprises second vertices for unique terms and second edges comprising one of defined type connections and mentioned type connections;
    identifying one or more subgraphs of the content graph;
    training a curriculum creator machine learning model by calibrating third weights;
    using the trained curriculum creator machine learning model that receives an input of the content graph output by the graph builder machine learning model and outputs one or more paths through each of the one or more subgraphs, wherein the one or more paths in a subgraph intersect at an intersection content item in the subgraph and identify one or more prerequisite content items with associated second edges comprising the defined type connections for the intersection content item, and one or more subsequent content items with associated second edges comprising the mentioned type connections for the intersection content item; and
    in response to selection of a content item of the one or more content items, sending an enhanced content item based on the one or more paths for the content item to a content renderer, wherein the content renderer plays the enhanced content item by playing the one or more prerequisite content items, the content item, and the one or more subsequent content items.

2. The computer-implemented method of claim 1, comprising further operations for:
    enhancing the selected content item to generate the enhanced content item by adding a link to a term of the one or more terms and providing a confidence level, wherein the link is to another content item.

3. The computer-implemented method of claim 2, wherein the another content item comprises a description of the term.

4. The computer-implemented method of claim 2, wherein the confidence level indicates an accuracy of the another content item, and wherein the accuracy is re-evaluated over time.

5. The computer-implemented method of claim 2, comprising further operations for:
generating a digital handbook that includes a summary of the content items that include the term with the link.

6. The computer-implemented method of claim 1, wherein a personalization component machine learning model is used to generate the enhanced content item.

7. The computer-implemented method of claim 1, comprising further operations for:
identifying one or more content expansion recommendations; and
provisioning a content expansion recommendation report with the one or more content expansion recommendations.

8. The computer-implemented method of claim 1, wherein a Software as a Service (SaaS) is configured to perform the operations of the computer-implemented method.

9. A computer program product, the computer program product comprising a computer readable storage medium having program code embodied therewith, the program code executable by at least one processor to perform operations for:
receiving one or more content items and an associated transcript for each of the one or more content items;
identifying one or more terms in the one or more content items;
training a content analyzer machine learning model by calibrating first weights;
using the trained content analyzer machine learning model that receives inputs of the one or more content items and each associated transcript and outputs a content tree for each of the one or more content items, wherein the content tree comprises first vertices and first edges, and wherein an edge to a vertex of the first vertices for a term of the one or more terms comprises an indication of whether the term is one of defined and mentioned;
training a graph builder machine learning model by calibrating second weights;
using the trained graph builder machine learning model that receives inputs of the one or more content items and each content tree output by the content analyzer machine learning model and outputs a content graph, wherein the content graph comprises second vertices for unique terms and second edges comprising one of defined type connections and mentioned type connections;
identifying one or more subgraphs of the content graph;
training a curriculum creator machine learning model by calibrating third weights;
using the trained curriculum creator machine learning model that receives an input of the content graph output by the graph builder machine learning model and outputs one or more paths through each of the one or more subgraphs, wherein the one or more paths in a subgraph intersect at an intersection content item in the subgraph and identify one or more prerequisite content items with associated second edges comprising the defined type connections for the intersection content item, and one or more subsequent content items with associated second edges comprising the mentioned type connections for the intersection content item; and
in response to selection of a content item of the one or more content items, sending an enhanced content item based on the one or more paths for the content item to a content renderer, wherein the content renderer plays the enhanced content item by playing the one or more prerequisite content items, the content item, and the one or more subsequent content items.

10. The computer program product of claim 9, wherein the program code is executable by the at least one processor to perform operations for:
enhancing the selected content item to generate the enhanced content item by adding a link to a term of the one or more terms and providing a confidence level, wherein the link is to another content item.

11. The computer program product of claim 10, wherein the another content item comprises a description of the term.

12. The computer program product of claim 10, wherein the confidence level indicates an accuracy of the another content item, and wherein the accuracy is re-evaluated over time.

13. The computer program product of claim 10, wherein the program code is executable by the at least one processor to perform operations for:
generating a digital handbook that includes a summary of the content items that include the term with the link.

14. The computer program product of claim 9, wherein a personalization component machine learning model is used to generate the enhanced content item.

15. The computer program product of claim 9, wherein the program code is executable by the at least one processor to perform operations for:
identifying one or more content expansion recommendations; and
provisioning a content expansion recommendation report with the one or more content expansion recommendations.

16. The computer program product of claim 9, wherein a Software as a Service (SaaS) is configured to perform the operations of the computer program product.

17. A computer system, comprising:
one or more processors, one or more computer-readable memories and one or more computer-readable, tangible storage devices; and
program instructions, stored on at least one of the one or more computer-readable, tangible storage devices for execution by at least one of the one or more processors via at least one of the one or more computer-readable memories, to perform operations comprising:
receiving one or more content items and an associated transcript for each of the one or more content items;
identifying one or more terms in the one or more content items;
training a content analyzer machine learning model by calibrating first weights;
using the trained content analyzer machine learning model that receives inputs of the one or more content items and each associated transcript and outputs to build a content tree for each of the one or more content items, wherein the content tree comprises first vertices and first edges, and wherein an edge to a vertex of the first vertices for a term of the one or more terms comprises an indication of whether the term is one of defined and mentioned;
training a graph builder machine learning model by calibrating second weights;
using the trained graph builder machine learning model that receives inputs of the one or more content items and each content tree output by the content analyzer machine learning model and outputs a content graph, wherein the content graph comprises second vertices for unique terms and second edges comprising one of defined type connections and mentioned type connections;

identifying one or more subgraphs of the content graph;

training a curriculum creator machine learning model by calibrating third weights;

using the trained curriculum creator machine learning model that receives an input of the content graph output by the graph builder machine learning model and outputs one or more paths through each of the one or more subgraphs, wherein the one or more paths in a subgraph intersect at an intersection content item in the subgraph and identify one or more prerequisite content items with associated second edges comprising the defined type connections for the intersection content item, and one or more subsequent content items with associated second edges comprising the mentioned type connections for the intersection content item; and in response to selection of a content item of the one or more content items, sending an enhanced content item based on the one or more paths for the content item to a content renderer, wherein the content renderer plays the enhanced content item by playing the one or more prerequisite content items, the content item, and the one or more subsequent content items.

18. The computer system of claim 17, wherein the operations further comprise:

enhancing the selected content item to generate the enhanced content item by adding a link to a term of the one or more terms and providing a confidence level, wherein the link is to another content item.

19. The computer system of claim 18, wherein the another content item comprises a description of the term.

20. The computer system of claim 17, wherein a Software as a Service (SaaS) is configured to perform the operations of the computer system.

* * * * *